United States Patent
Lin et al.

(10) Patent No.: US 7,595,682 B2
(45) Date of Patent: Sep. 29, 2009

(54) MULTI-STAGE CHARGE PUMP WITHOUT THRESHOLD DROP WITH FREQUENCY MODULATION BETWEEN EMBEDDED MODE OPERATIONS

(75) Inventors: Yufe Feng Lin, Taoyuan (TW); Yu Shen Lin, Taipei (TW); Roger Chen, Taichung (TW); Chun Hsiung Hung, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 11/064,920

(22) Filed: Feb. 24, 2005

(65) Prior Publication Data
US 2006/0186947 A1  Aug. 24, 2006

(51) Int. Cl.
*G05F 1/10* (2006.01)
(52) U.S. Cl. .................................. 327/536; 363/60
(58) Field of Classification Search ......... 327/536–538, 327/143, 198, 60, 63, 82; 363/59–60
See application file for complete search history.

(56) References Cited

U.S. PATENT DOCUMENTS

| | | | | |
|---|---|---|---|---|
| 5,381,051 A | | 1/1995 | Morton | 327/390 |
| 5,432,469 A | * | 7/1995 | Tedrow et al. | 327/306 |
| 5,644,534 A | * | 7/1997 | Soejima | 365/185.23 |
| 5,781,473 A | | 7/1998 | Javanifard et al. | 365/185.18 |
| 5,801,987 A | * | 9/1998 | Dinh | 365/185.18 |
| 6,441,678 B1 | * | 8/2002 | Zeng et al. | 327/536 |
| 6,456,154 B2 | * | 9/2002 | Sugimura | 327/537 |
| 6,486,728 B2 | * | 11/2002 | Kleveland | 327/536 |
| 6,573,780 B2 | | 6/2003 | Lin et al. | 327/536 |
| 6,661,682 B2 | * | 12/2003 | Kim et al. | 363/59 |
| 6,667,928 B2 | * | 12/2003 | Honma et al. | 365/226 |
| 6,914,791 B1 | * | 7/2005 | Park et al. | 363/60 |
| 2003/0128560 A1 | * | 7/2003 | Saiki et al. | 363/65 |
| 2004/0000941 A1 | * | 1/2004 | Kuo et al. | 327/291 |

* cited by examiner

*Primary Examiner*—Lincoln Donovan
*Assistant Examiner*—Thomas J Hiltunen
(74) *Attorney, Agent, or Firm*—Kenta Suzue; Haynes Beffel & Wolfeld LLP

(57) ABSTRACT

A multimode charge pump circuit has a single charge pump that is responsive to a set of clock signals. The set of clock signals is provided in a first mode with a variable frequency according to a first function of the supply potential and temperature, and in a second mode with a variable frequency according to a second function of the supply potential and temperature. Circuitry configures all of the plurality of stages in series during the first mode in order to produce a higher voltage output, and configures a subset of the plurality of stages in series, while disabling the other stages, during the second mode in order to produce a lower voltage output. A precharge circuit is provided that operates as a supply node in the second mode, and as a precharge/clamp in the first mode.

33 Claims, 17 Drawing Sheets

MULTI-STAGE CHARGE PUMP WITHOUT THRESHOLD DROP WITH FREQUENCY MODULATION BETWEEN EMBEDDED MODE OPERATIONS

BACKGROUND OF THE INVENTION

1. Field of the Invention

The present invention relates to charge pump circuitry, including charge pump circuitry used in integrated circuits having multiple modes of operation.

2. Description of Related Art

Charge pumps are used in integrated circuit design to provide negative voltages, and positive voltages higher than a supply potential available to the integrated circuit. In some integrated circuits, more than one charge pump is required to serve different modes of operation on the integrated circuit, or to serve different circuit modules on the integrated circuit. The charge pumps on the integrated circuit are adapted for the particular mode of operation or circuit module so that performance of the charge pump meets the needs of the load being driven in such parameters as output voltage level, output current level and responsiveness.

For example, in integrated circuit devices including flash memory, a first charge pump can be used during a read mode and a second charge pump can be used during a program or erase mode. The charge pump used during the read mode maintains an output node coupled to word line drivers, which has a relatively high capacitive load, at a voltage (typically 4 to 5 volts) that is a relatively small increment higher than the supply potential, and must support fast response times. The charge pump used during the program or erase mode provides a relatively high voltage (typically 7 to 10 volts), which should be as uniform as possible in order to maintain uniform programming or erasing performance across the memory array.

Charge pumps are often implemented in multiple stages arranged in series, where each stage contributes an increment of voltage boost. Thus, higher voltage charge pumps often have a larger number of stages in series than lower-voltage charge pumps. Techniques have been investigated by which the series of stages in a multistage charge pump is configured to provide high voltage and low voltage modes, by selectively increasing or decreasing the number of stages in operation. Also, multistage charge pumps can be sensitive to changes in the supply potential, changes in the clock rates provided for driving the charge pumps, and changes in the load driven by the charge pumps. Thus, techniques have developed to compensate for such changes. Representative multistage charge pump technology is described in U.S. Pat. Nos. 5,781,473, 5,801,987, 6,486,728, and our own U.S. Pat. No. 6,573,780.

One prior art configuration of an integrated circuit with multiple modes is shown in FIG. 1. The integrated circuit in FIG. 1 includes a nonvolatile memory array 10 including a wordline decoder with a corresponding set of word line drivers in block 11, a column decoder 12 and a corresponding set of column select pass gates 13. A first charge pump 14 (read) is used during the read mode and a second charge pump 15 used during program and erase modes.

The output of the first charge pump 14 is coupled to a read regulator 15 and drives a wordline power supply node AVX which has significant load capacitance as represented by the capacitor symbol 17 on the node AVX. Leakage current allows the voltage on the load capacitance 17 to fall at a rate that changes with the temperature of the integrated circuit. The first charge pump 14 is driven by a four-phase clock 18, which is controlled by feedback through a read level detector 19. The four-phase clock 18 is controlled by a control logic block 20, which enables and disables the clock. The first charge pump is enabled in response to a "slow clock" 21 and by an address transition detection ATD system 22 that is responsive to input addresses. The "slow clock" 21 operates to periodically enable the first charge pump 14 during the intervals of low read activity, maintaining the voltage on the node AVX so that the integrated circuit quickly reacts to read events. The ATD system 22 is active during read events based on transitions in input addresses, and maintains the voltage on the node AVX at the desired read potential during periods of active use.

The output of the second charge pump 25 (program/erase) is coupled to a program/erase PGM/ERS mode regulator 26 and drives a bit line power supply node VPP during program and erase modes which is coupled through the column select pass gates 13 into the array during program or erase operations. The load capacitance driven by the second charge pump 25 is not illustrated in the figure. It is desirable however that the power supply node VPP have uniform voltage levels during program and erase operations, for more uniform program and erase results. Also, the power supply node VPP is typically driven at a higher voltage than the wordline power supply node AVX during read mode.

The second charge pump 25 is driven by a second four-phase clock 27, which is controlled by feedback through a program and erase level detector 28. The second charge pump 25 and second four-phase clock 27 are adapted for the program and erase modes, having a different number of charge pump stages operating at different clock frequencies as necessary to meet system specifications. The second charge pump is enabled in this example by a state machine 29 during execution of program and erase algorithms for the memory array 10. The state machine 29 is managed in response to a command decoder 30, typically responsive to data signals on the data bus 31, and other control signals applied to the chip.

As can be seen with reference to FIG. 1, prior art integrated circuits having more than one mode of operation, and requiring charge pumps for the multiple modes like flash memory devices, have typically required more than one charge pump circuit with supporting clocks and other logic. Charge pumps are relatively large circuits, with capacitors and other components that take space on the integrated circuit.

It is desirable to provide charge pump technology for multimode circuits, which conserves space on an integrated circuit, and improves efficiency of operation of the integrated circuit.

SUMMARY OF THE INVENTION

The present invention provides a multimode charge pump circuit, including embodiments having a single charge pump that is responsive to a set of clock signals. Embodiments of the multimode charge pump include a plurality of stages, with circuitry to configure all of the plurality of stages in series during the first mode in order to produce a higher voltage output and to configure a subset of the plurality of stages in series, while disabling the other stages, during the second mode in order to produce a lower voltage output, while maintaining high charge pump efficiency in both modes.

Embodiments of the multimode charge pump described herein include a precharge circuit coupled to at least one corresponding stage, operable in the first mode in a manner that enables transfer of higher voltages from previous stages to the corresponding stage in the multimode charge pump, and operable in the second mode in a manner that couples the input supply potential to the corresponding stage, without significant voltage loss, by for example using a PMOS transistor having a drain coupled to a source of the supply potential, and with low voltage applied to its gate, and disables transfer of higher voltages to the corresponding stage from preceding stages. A significant voltage loss in this context is a voltage loss on the order of a threshold drop from a transistor operating in the linear mode.

A precharge circuit is described which includes a first PMOS transistor having a source terminal coupled to a source of the supply potential, a drain terminal coupled to the supply node, and a gate; a second PMOS transistor having a source terminal coupled to the source node, a drain terminal coupled to the gate of the first PMOS transistor, and a gate coupled to a control node; and an NMOS transistor having a source terminal coupled to a reference supply, a drain terminal coupled to the gate of the first PMOS transistor, and a gate coupled to the control node. The first PMOS transistor is biased on with low voltage at is gate, when the control node is at a high potential, and transfers the supply potential to the supply node without significant voltage loss.

Circuitry is provided in embodiments of the multimode charge pump to provide the set of clock signals in a first mode having a variable frequency according to a first function of the supply potential and temperature, and in a second mode having a variable frequency according to a second function of the supply potential and temperature. In one example, the first function has an inverse relation to changes in the supply potential and is relatively insensitive to changes in temperature, while the second function has a direct relation to changes in temperature, and is relatively insensitive to changes in the supply potential.

A charge pump apparatus described herein comprises a plurality of stages including a first stage and a last stage with one or more intermediate stages arranged in series between the first and last stages. Each stage includes a supply node, an output node and a pass gate. The pass gate is arranged to couple the supply node to the output node when the supply node is at higher voltage, and to block charge flow from the output node back to the supply node when the output node is at higher voltage. The first stage has its supply node coupled to a supply voltage. The intermediate stages have respective supply nodes coupled to the output nodes of respective preceding stages in the plurality of stages. The last stage in the plurality of stages has its supply node coupled to the output node of its preceding stage and its output node coupled to a load to be driven by the charge pump, typically via a voltage regulator. A first plurality of charge boosting circuits is coupled to the supply nodes of the intermediate stages and of the last stage in the plurality of stages. Also a second plurality of charge boosting circuits is coupled to the pass gates of the first stage, the intermediate stages and the last stage.

One or more precharge circuits, having first and second states as described above, are coupled respectively to the supply nodes of one or more of the intermediate stages and the last stage. The precharge circuits are utilized to configure the plurality of charge pump stages, by applying control signals that cause the precharge circuit connected to a corresponding intermediate stage to enter the second state, while causing the precharge circuits coupled to the following stages to enter the first state. In this manner, the intermediate stage coupled to the precharge circuit in the second state, becomes the input stage for the charge pump, and is able to receive a supply potential as input, via a transistor for example, substantially without voltage drop.

A clock source provides a plurality of clock signals to the first and second pluralities of charge boosting circuits. The plurality of clock signals have a frequency which changes according to a first function during a first mode and according to a second function in a second mode as described above. Circuitry is also included on the integrated circuit, that provides control signals to the one or more precharge circuits and to the clock source.

The technology described herein provides charge pump technology which is configurable for operation in multimode environments, including the use of different clocks for different modes and the use of different numbers of charge pump stages in different modes. The charge pump technology therefore allows for optimized power efficiency and a reduction in the number of capacitors needed on a single integrated circuit having multiple charge pump modes.

The charge pump technology described herein is adapted for flash memory, including floating gate memory technology and other charge storage technologies like nitride read-only memory. Flash memory devices typically have a read and standby mode requiring fast response times over a wide temperature range but relatively lower charge pump output voltage, and a program or erase mode requiring higher charge pump output voltage and consistent output over varying supply voltages for programming and erasing operations such as channel hot electron injection and band-to-band tunneling induced hot hole injection. The charge pump technology described herein is suited for providing these modes of operation using a single charge pump, saving area on the integrated circuit and providing more efficient power operation.

Other aspects and advantages of the present invention can be seen on review of the drawings, the detailed description and the claims, which follow.

DETAILED DESCRIPTION

A detailed description of embodiments of the disclosed technology is provided with reference to the FIGS. 2-19.

Figure 1:
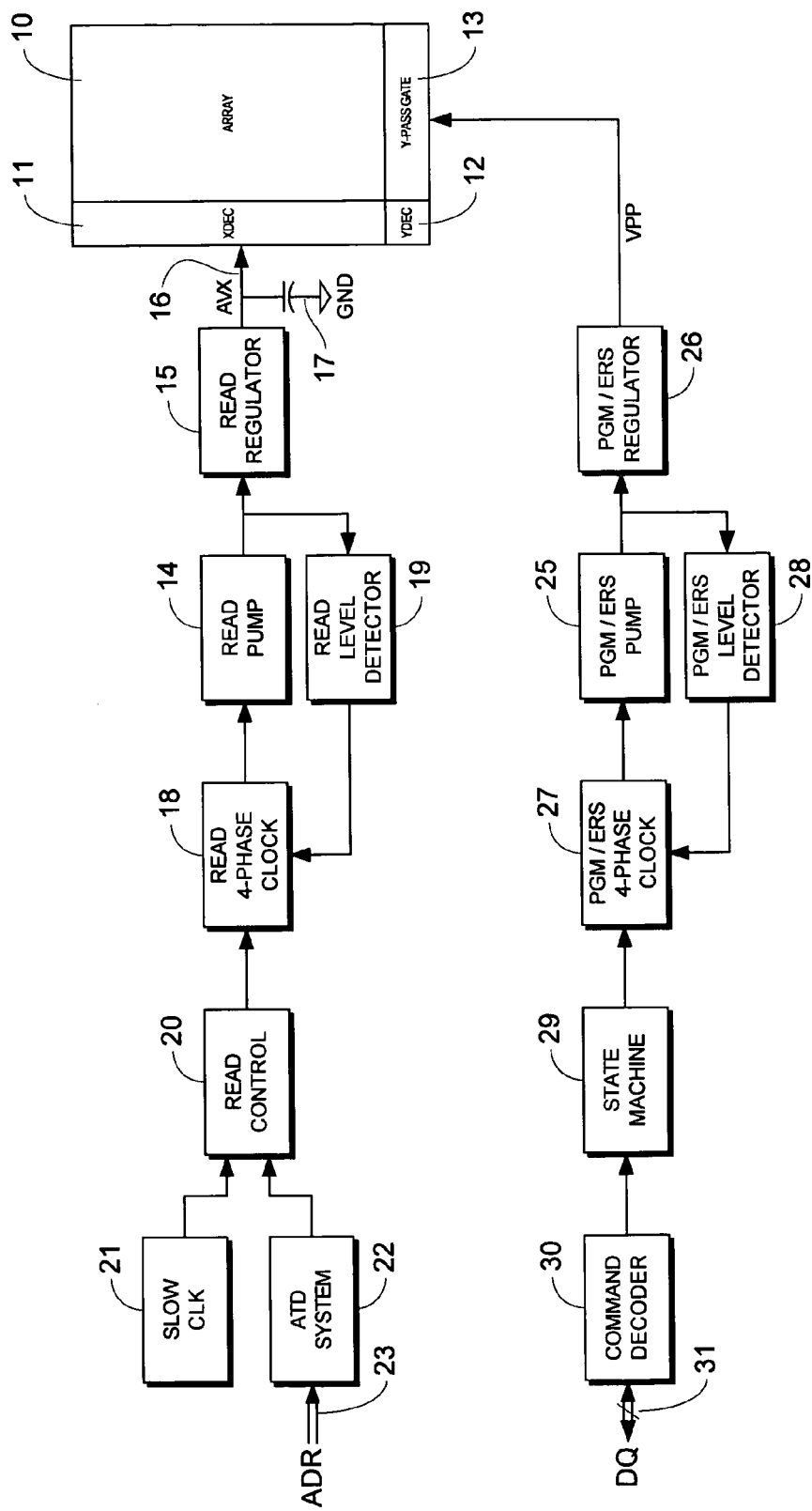
FIG. 1 is a block diagram of a prior art flash memory device including two charge pumps.
Figure 2:
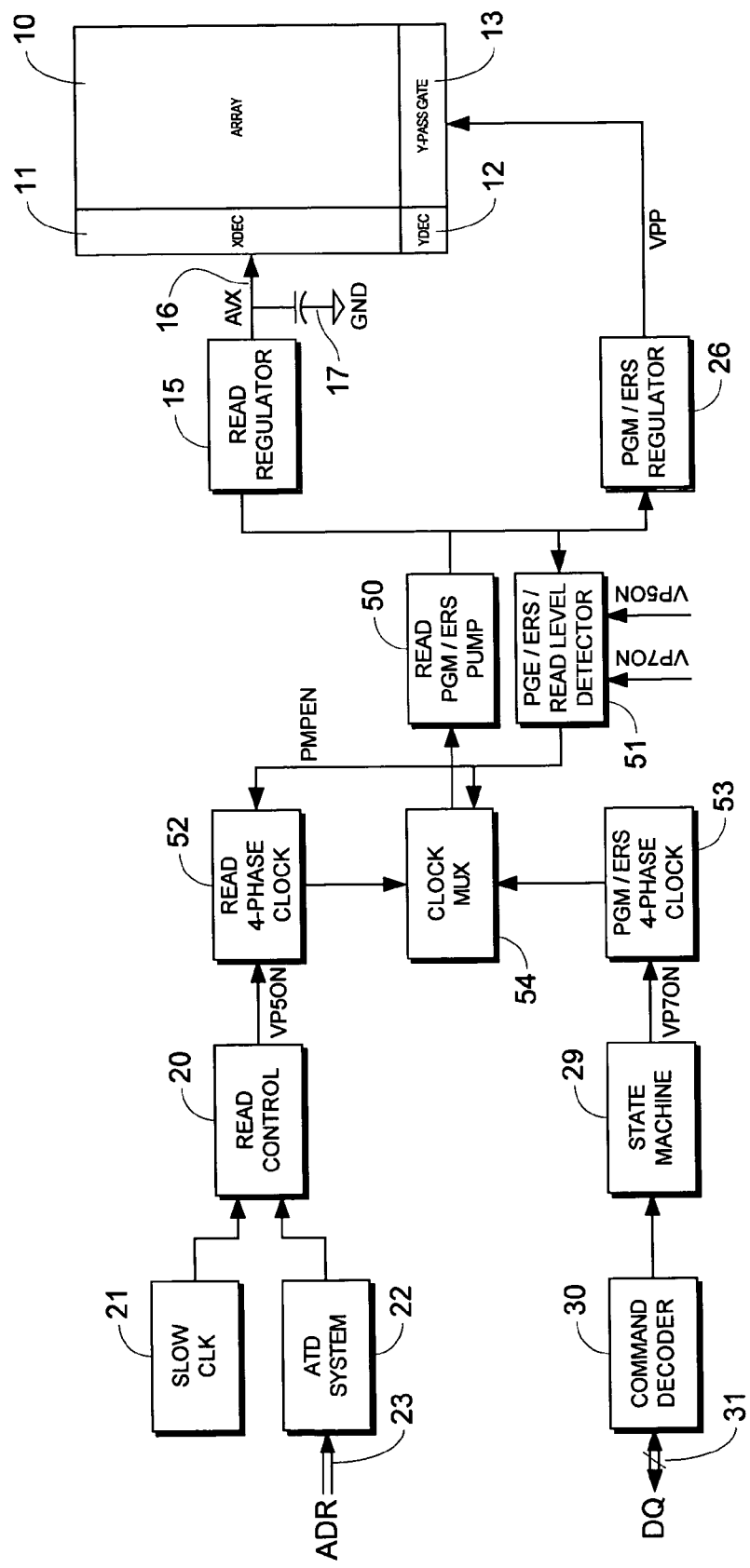
FIG. 2 is a block diagram of a flash memory device including shared charge pump technology as described herein.

FIG. 2 shows an embodiment of an integrated circuit with multiple modes and a high-efficiency, multiple mode charge pump, which can be contrasted with the prior art shown in FIG. 1, where like reference numbers identify similar circuitry and are not described again. In the embodiment of FIG. 2, a single charge pump 50 has its output coupled to both the read regulator 15 and PGM/ERS mode regulator 26, replacing the first pump 14 and second charge pump 25 of FIG. 1. Also, a single level detector 51 provides feedback for both modes of operation. A clock source for the charge pump 50 comprises a first read clock 52, a second program/erase clock 53 and a clock multiplexer 54 operable to couple either the output of the first read clock or the output of the second program/erase clock 53 to the charge pump 50. The circuitry implementing the multimode charge pump in FIG. 2 operates more efficiently, and utilizes less area on the integrated circuit than prior art devices.

Figure 3:
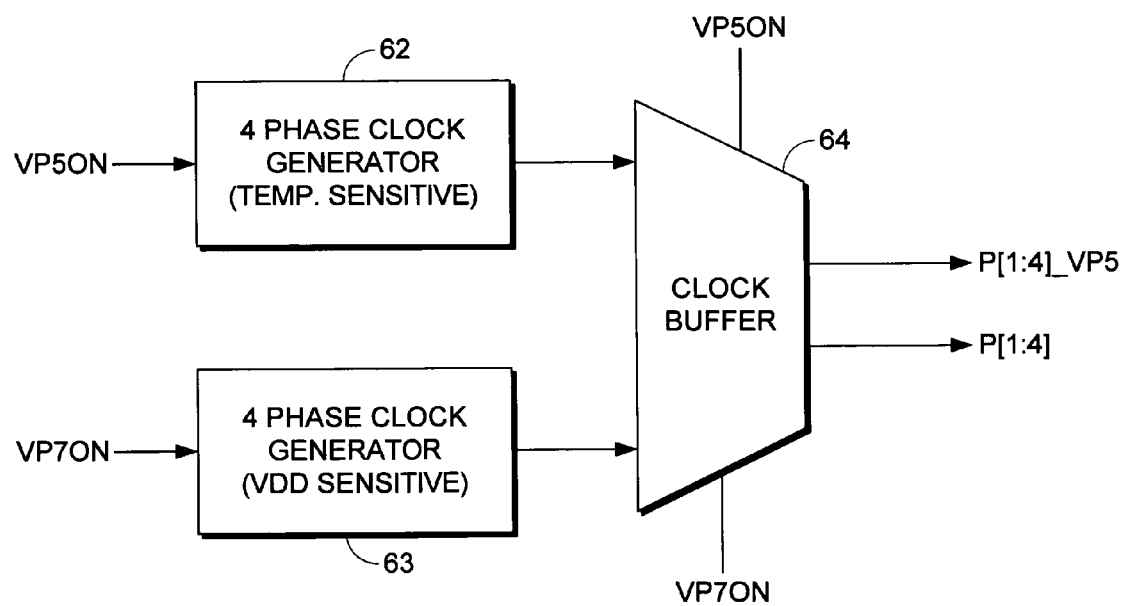
FIG. 3 is a simplified diagram of a clock source for embodiments of the charge pump technology described herein.
Figure 4:
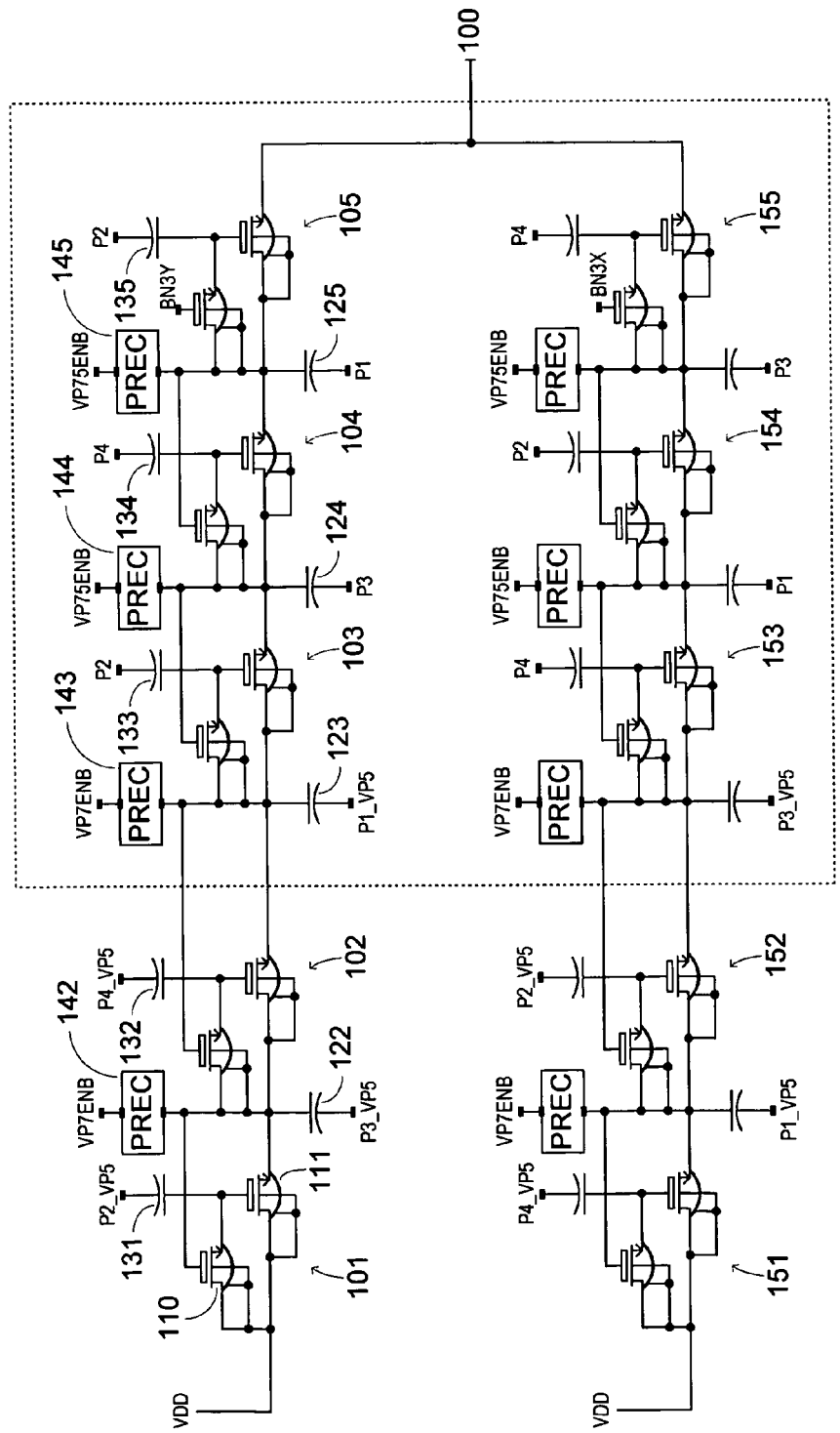
FIG. 4 illustrates a multistage charge pump suitable for use in a shared charge pump configuration as described herein.

FIG. 3 illustrates a simple configuration for a clock source providing a plurality of clock signals in a first mode where the frequency of the clock signals changes according to a function which has an inverse relation to changes in the supply potential, and in a second mode for the frequency the clock signals change according to a function having a direct relation to changes in temperature. Thus, a first four-phase clock generator 62 and a second four-phase clock generator 63 produce respective sets of four-phase clocks. The outputs of the clock generator 62 and clock generator 63 are applied to a clock buffer 64 which switches in response to the control signals VP5ON and VP7ON to output a plurality of clock signals which control boosting in a multistage charge pump, such as that described with reference to FIG. 4. In embodiments of the technology, the clock generator 62 is enabled by the control signal VP5ON and the clock generator 63 is enabled by the control signal VP7ON. Thus, in a first mode (VP7ON) the output of the clock generator 63 is applied by the clock buffer 64 as a plurality of clock signals for controlling the charge pump including four-phase pump clocks P[1: 4], which are coupled as shown in FIG. 4 to the last stage and the last two intermediate stages of the charge pump, and P[1:4]_VP5 which are coupled as shown in FIG. 4 to the input stage and the first intermediate stage of the charge pump. In a second mode (VP5ON) the output of the clock generator 62 is applied by the clock buffer 64 for controlling the charge pump including four-phase pump clocks P[1:4], which are coupled as shown in FIG. 4 to the last stage and the last two intermediate stages of the charge pump and the four phase clocks P[1:4]_VP5 are turned off.

FIG. 4 illustrates a representative four-phase charge pump, including a first plurality of stages arranged in series driving an output voltage on output node 100 and a second plurality of stages arranged in series driving the output voltage on the output node 100. Other embodiments include a single plurality of stages arranged in series.

The first plurality of stages in this example includes a first stage 101, a last stage 105, and three intermediate stages 102, 103, 104. Each stage comprises a supply node, an output node and a pass gate between the supply node and the output node. For example, the first stage 101 has a supply node coupled to a source of supply potential VDD. The pass gate of first stage 101 includes triple well transistor 110 having its drain coupled to the supply node, and coupled to the p-well and isolation n-well of the transistor 110. The gate of triple well transistor 110 is coupled to the output node of the first stage 101. The pass gate of the first stage 101 also includes triple well transistor 111, having its drain coupled to the supply node, and coupled to the p-well and isolation n-well of the transistor 111. The gate of the triple well transistor 111 is coupled to the source of the triple well transistor 110. The source of the triple well transistor 111 is coupled to the output node of the first stage 101. The pass gate in each of the stages 102-105 consists of two triple well transistors configured like triple well transistor 110 and triple well transistor 111 in the input stage of the charge pump, as illustrated in the FIG. 4.

A first plurality of charge boosting circuits including capacitors 122, 123, 124 and 125 is coupled to the supply nodes in the intermediate stages 102-104 and in the last stage 105. A second plurality of charge boosting circuits including capacitors 131, 132, 133, 134 and 135 is coupled respectively to the pass gates in each of the plurality of stages 101-105, at the gate of the triple well transistor 111 in the first stage 101, and similarly in each of the following stages. The four-phase clock signals from the clock source shown in FIG. 3 are arranged as illustrated, with P2_VP5 coupled to capacitor 131, P4_VP5 coupled to capacitor 132, P2 coupled to capacitor 133, P4 coupled to capacitor 134, and P2 coupled to capacitor 135. Also, P3_VP5 is coupled to capacitor 122, P1_VP5 is coupled to capacitor 123, P3 is coupled to capacitor 124, and P1 is coupled to capacitor 125.

Figure 5:
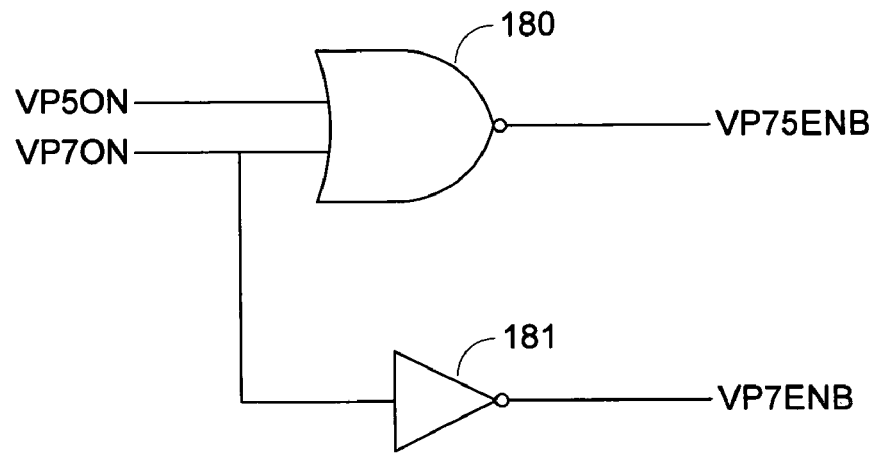
FIG. 5 illustrates control circuitry used in combination with the multistage charge pump of FIG. 4.

A plurality of precharge circuits 142-145 is coupled to the supply nodes of the intermediate stages 102, 103, 104 and of the last stage 105. The precharge circuits 142-145 are controlled by the control signals VP7ENB, indicating that VP7ON is asserted, and VP75ENB indicating that either VP5ON or VP7ON is asserted. An example of logic circuits for generating the control signals VP7ENB and VP75ENB is shown in FIG. 5, including a NOR gate 180 and an inverter 181. The signals VP5ON and VP7ON are applied as inputs to the NOR gate 180. The output of the NOR gate 180 is the signal VP75ENB. The signal VP7ON is applied as input to the inverter 181, the output of which is the control signal VP7ENB.

The plurality of precharge circuits 142-145 comprises circuitry having a first state preventing the supply node from falling significantly below the supply potential, and allowing the supply node to fluctuate at a level above VDD in response to the pumping clocks/capacitors, and thereby performing a precharge and clamping function, and a second state coupling the supply node to a source of the supply potential VDD, and thereby decoupling the corresponding stage from preceding stages. Thus, the control circuitry provides clocks and control signals for configuring the plurality of stages 101-105 for operation in a first mode in which all stages are enabled, and the precharge circuits 142-145 act in the first state as standard precharge/clamp circuits. The control circuitry also provides clocks and control signals for configuring the plurality of stages for operation in a second mode in which the supply node of stage 103 is coupled to a source of the supply potential VDD through the precharge circuit 143, disabling the preceding stages 101 and 102, and enabling stages 103, 104 and 105.

The charge pump in FIG. 4 includes a second plurality of stages 151-155 arranged in parallel with the first plurality of stages 101-105. The circuitry is configured in the same manner, and the output nodes of the last stages 105 and 155 are coupled together at node 100. The second plurality of stages 151-155 however is coupled to the four-phase clocks one step out-of-phase, as illustrated in a manner which reduces fluctuation of the output voltage and increases output current on node 100.

Figure 6:
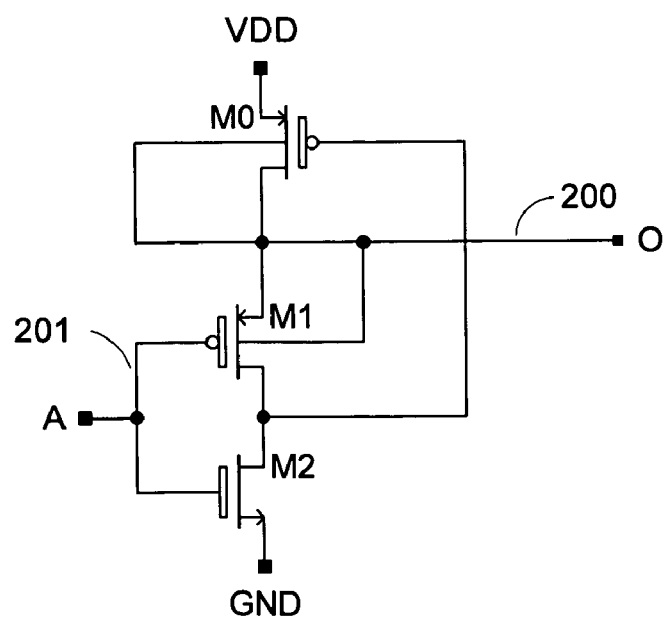
FIG. 6 is a transistor level diagram of a precharge circuit used in the multistage charge pump of FIG. 4.

An embodiment of the precharge circuit suitable for use in the system of FIG. 4 is shown in FIG. 6. The precharge circuit includes a first PMOS transistor M0, a second PMOS transistor M1, and an NMOS transistor M2. The source of the first PMOS transistor M0 is coupled to a source of the supply potential VDD. The drain and n-well of the first PMOS transistor M0 are coupled to node 200 which is coupled to the supply node of the corresponding stage in the charge pump. The source and n-well of the second PMOS transistor M1 are coupled to the drain of the first PMOS transistor M0 and to node 200. The drain of the second PMOS transistor M1 is coupled to the gate of the first PMOS transistor M0. The drain of the NMOS transistor M2 is coupled to the drain of the second PMOS transistor M1 and to the gate of the first PMOS transistor M0. The source of the NMOS transistor M2 is coupled to ground. The gates of the second PMOS transistor M1 and the NMOS transistor M2 are coupled together to the node 201, which receives the control signal for the precharge circuit (one of VP75ENB and VP7ENB in the circuit of FIG. 4). In operation, when the control signal on node 201 is high, the gate of the first PMOS transistor M0 is low turning on the transistor M0, coupling the source of the supply potential VDD to the output node 200, without a threshold drop or other significant voltage loss. In this manner, the supply potential VDD is applied to the corresponding stage of the charge pump. When the control signal A on node 201 is low, the second PMOS transistor M1 is on, coupling the voltage O on the output node 200 to the gate of the first PMOS transistor M0. In this state, the precharge circuit acts as a precharge clamp, turning on first PMOS transistor M0 when the output node 200 falls below the supply potential VDD. However, during operation, the pumping node (e.g. source of transistor 111 in FIG. 4) that is coupled to the node 200 on the precharge circuit will be higher than VDD, so that the PMOS transistor M0 does not turn on, and does not affect operation of the charge pump.

Figure 7:
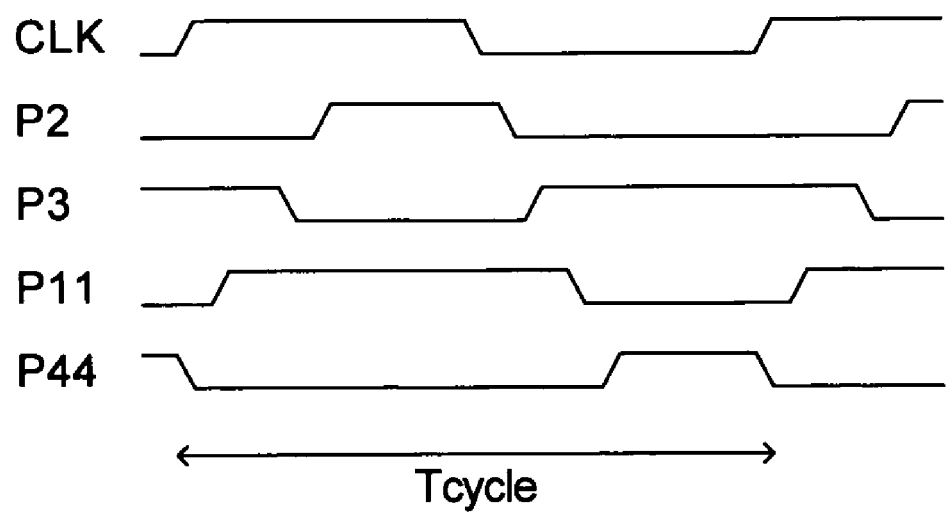
FIG. 7 illustrates a plurality of clock signals suitable for driving the multistage charge pump of FIG. 4.

FIG. 7 illustrates a clock signal CLK and a set of four-phase clock signals P[1:4] generated in response to the clock signal, and thereby having a frequency which is adjusted by changes in frequency of the clock signal CLK. The four-phase clock signals P[1:4] are implemented with transitions that are non-overlapping, and arranged for causing the plurality of stages in the charge pump to boost charge on the supply nodes and transfer charge to the output nodes in a sequence that maintains the output voltage on the output node of the charge pump at the elevated level. The loadline of the charge pump can be adjusted by adjusting of frequency of the clock signal CLK, with higher frequencies causing more current flow through the plurality of stages, and lower frequencies causing less current flow.

Figure 8:
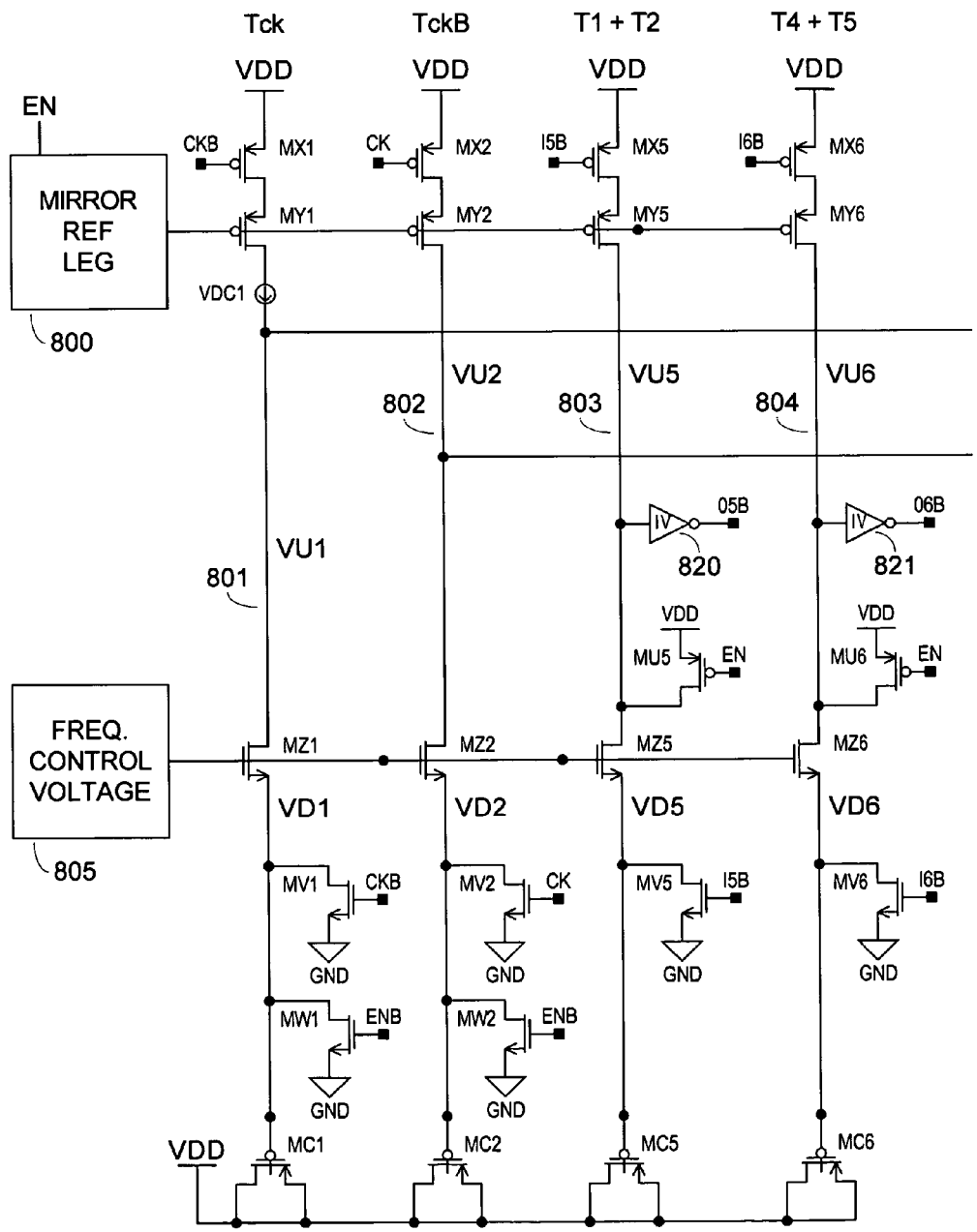
FIGS. 8-10 illustrate a representative circuit for generating a clock signal according to a function of supply potential and temperature.
Figure 9:
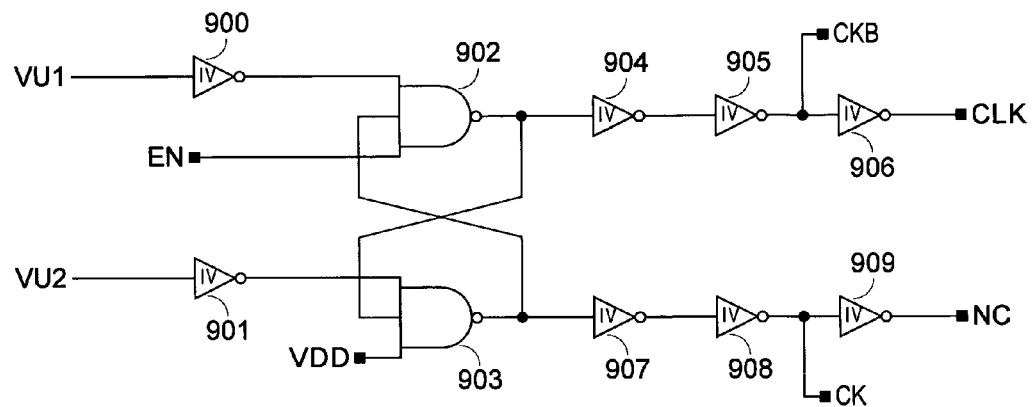
Figure 10:
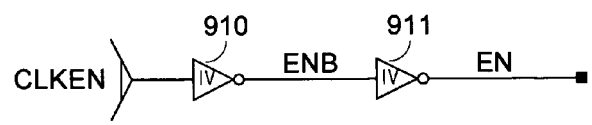

Representative embodiments of a clock source for producing the clock signal CLK and the four-phase clock signals P[1:4] are described with reference to FIGS. 8-15, in which FIGS. 8-10 show a basic circuit for an adjustable clock. In FIG. 8, a circuit for controlling a frequency of a clock shown which includes a reference leg 800 for a current mirror circuit having four output legs 801-804. A frequency control voltage is produced by circuit 805, and can be used to implement a function of the supply potential and temperature as described in more detail below. Representative reference legs 800 and frequency control voltage circuits 805 are illustrated below with reference to FIGS. 14 and 15.

Output leg 801 includes PMOS transistors MX1 and MY1 and NMOS transistor MZ1 in series driving a capacitor configured PMOS transistor MC1, having source and drain coupled to a source of the supply potential VDD and a gate coupled to the source of the transistor MZ1. The node VD1 between the source of the transistor MZ1 and the gate of the capacitor configured transistor MC1 is preset to ground using NMOS transistor MV1 having its gate coupled to the feedback signal CKB (see FIG. 9) and using NMOS transistor MW1 having its gate coupled to the control signal ENB (see FIG. 10). This causes the node VU1 to likewise be preset near ground. Current flow on the first leg 801 is enabled by transistor MX1 having its gate coupled to the feedback signal CKB. The transistor MV1 has its gate coupled to the current mirror reference leg 800. In operation, the nodes VD1 and VU1 are preset to near ground when either CKB or ENB is high. When CKB goes low, current flows in the leg, and when ENB is low, the current charges up the capacitor configured transistor MC1. This causes the voltage on node VD1 to increase. When VD1 is high enough relative to the voltage on the gate of MZ1 to turn off the transistor MZ1, the voltage on node VU1 is quickly pulled up toward the supply potential. The voltage on the node VU1 is applied to an inverter 900 shown in FIG. 9, and operates to control timing of the output clock signal CLK, as described below.

Output leg 802 includes PMOS transistors MX2 and MY2 and NMOS transistor MZ2 in series driving a capacitor configured transistor MC2. The node VD2 between the source of the transistor MZ2 and the gate of the capacitor configured transistor MC2 is preset to ground using NMOS transistor MV2 having its gate coupled to the feedback signal CK (see FIG. 9) and using NMOS transistor MW2 having its gate coupled to the control signal ENB (see FIG. 10). This causes the node VU2 to likewise be preset near ground. Current flow on the second leg 802 is enabled by transistor MX2 having its gate coupled to the feedback signal CK. The transistor MV2 has its gate coupled to the current mirror reference leg 800. Output leg 802 operates in the same manner as output leg 801, except out-of-phase by 180 degrees with reference to the feedback signals CK and CKB. The voltage on the node VU2 is applied to an inverter 901 as shown in FIG. 9, and operates to control the timing of the output clock signal CLK.

Figure 11:
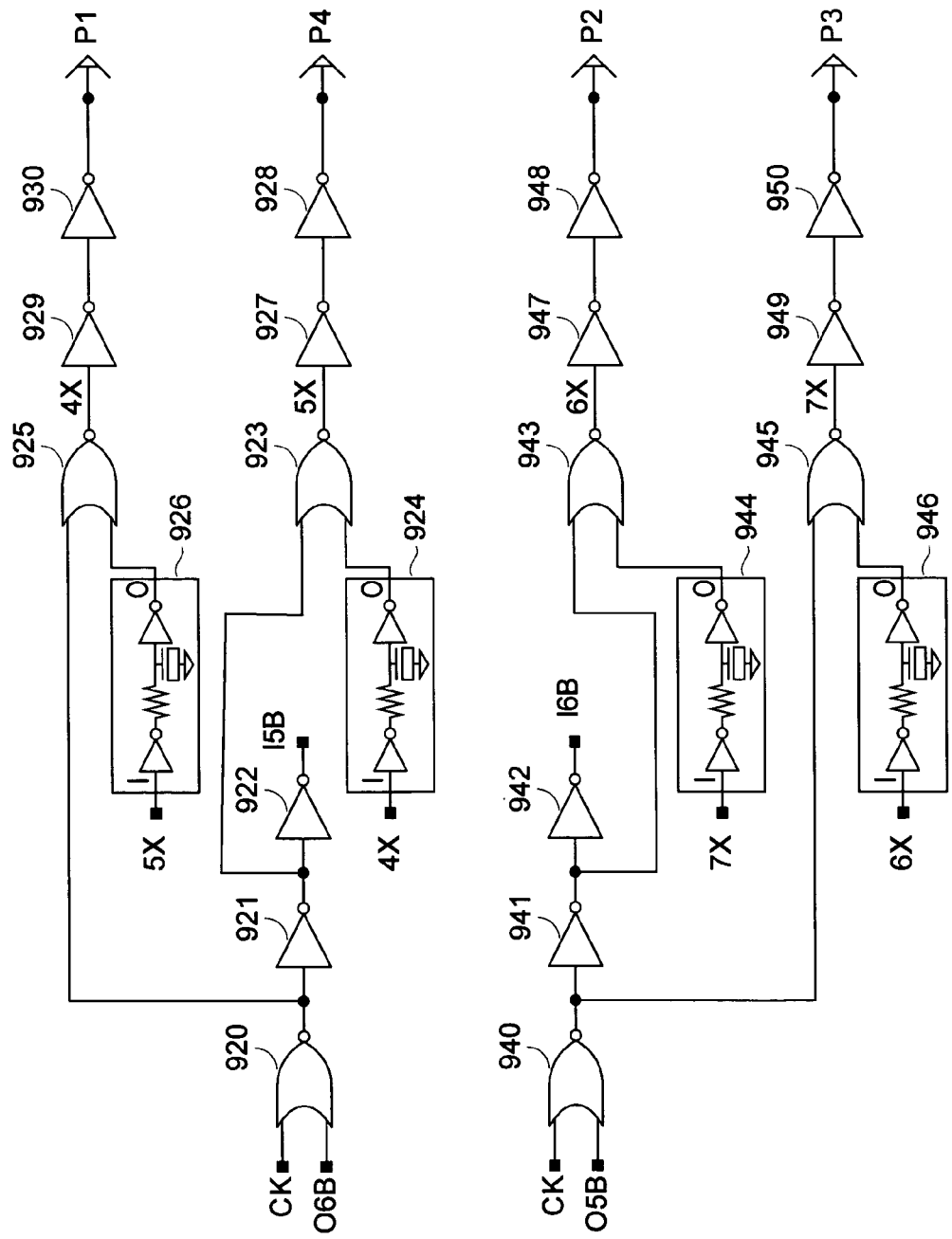
FIG. 11 illustrates circuitry for producing a plurality of non-overlapping clock signals based on the clock signal generated by the circuit of FIGS. 8-10.

Output leg 803 includes PMOS transistors MX5 and MY5 and NMOS transistor MZ5 in series driving a capacitor configured transistor MC5. The node VD5 between the source of the transistor MZ5 and the gate of the capacitor configured transistor MC5 is preset to ground using NMOS transistor MV5 having its gate coupled to the feedback signal I5B (see FIG. 11). The node VU5 is preset to the supply voltage VDD using PMOS transistor MU5 having its gate coupled to the control signal EN (see FIG. 10). This causes the nodes VU5 to be preset near VDD, and the node VD5 to the set at a value dependent on the output of the frequency control block 805. Current flow on the third leg 803 is enabled by transistor MX5 having its gate coupled to the feedback signal I5B. The transistor MV5 has its gate coupled to the current mirror reference leg 800. Output leg 803 operates in the same manner as output leg 801, except that VU5 starts high, and is pulled low when I5B is high and EN is low, then rises back. VU5 is applied to the inverter 820 and causes a pulse in the output signal O5B, used in the generation of the four-phase clock as shown in FIG. 11.

Output leg 804 includes PMOS transistors MX6 and MY6 and NMOS transistor MZ6 in series driving a capacitor configured transistor MC6. The node VD6 between the source of the transistor MZ6 and the gate of the capacitor configured transistor MC6 is preset to ground using NMOS transistor MV6 having its gate coupled to the feedback signal I6B (see FIG. 11). The node VU6 has a load like node VU5, using PMOS transistor MU6 having its gate coupled to a source of the supply potential VDD, which is thus always off. Current flow on the fourth leg 804 is enabled by transistor MX6 having its gate coupled to the feedback signal I6B. The transistor MV6 has its gate coupled to the current mirror reference leg 800. Output leg 804 operates in the same manner as output leg 801, except that VU6 is pulled low when I6B is high. VU6 is applied to the inverter 821 and drives the output signal O6B, used in the generation of the four-phase clock as shown in FIG. 11.

FIG. 9 and FIG. 10 illustrate circuitry for producing a clock signal with variable frequency from the signals VU1 and VU2 produced in the circuit of FIG. 8. VU1 is applied to the input of inverter 900, the output of which is applied to a first input of a three-input NAND gate 902. VU2 is applied to the input of inverter 901, the output of which is applied to a first input of a three-input NAND gate 903. The output of NAND gate 902 is coupled to a second input of the NAND gate 903. Likewise, the output of the NAND gate 903 is coupled to a second input of the NAND gate 902. The third input of the NAND gate 902 is the control signal EN. The third input of the NAND gate 903 is the supply potential VDD. The output of NAND gate 902 is applied to a set of inverters 904, 905, 906 arranged in series. The output of the inverter 905 is the signal CKB. The output of NAND gate 903 is applied to a set of inverters 907, 908, 909 arranged in series. The output of the inverter 908 is the signal CK. The output of inverter 906 drives the probe point with the signal CLK. The output of inverter 909 is unconnected.

FIG. 10 illustrates a circuit with inverter 910 and inverter 911 arranged in series. The input to the inverter 910 is a control signal CLKEN, which is applied to turn on the clock. The output of the inverter 910 is the control signal ENB applied in the circuit of FIG. 8. Likewise, the output of the inverter 911 is the control signal EN applied in the circuit of FIG. 8.

FIG. 11 illustrates a circuit suitable for producing the four-phase nonoverlapping clock signals P[1:4] based on the clock signals CK and CKB produced by the circuit of FIG. 9, and the control signals O6B and O5B produced by the circuit of FIG. 8.

The signals CK and O6B are applied as inputs to NOR gate 920. The output of NOR gate 920 is applied to the inverter 921, having its output applied to the input of inverter 922 and to the input of the NOR gate 923. The output of the inverter 922 provides the control signal I5B applied in the circuit of FIG. 8. The second input to NOR gate 923 is the output of the delay circuit 924, which has as input the signal 4X which is produced at the output of the NOR gate 925. The first input to the NOR gate 925 is the output of the NOR gate 920. The second input of the NOR gate 925 is the output of the delay circuit 926, which has as input the signal 5X generated at the output of the NOR gate 923. The output of the NOR gate 923 is applied to inverter 927 and inverter 928 in series which produces the clock signal P4. The output of the NOR gate 925 is applied to inverter 929 and inverter 930 in series which produces a clock signal P1.

The signals CKB and O5B are applied as inputs to NOR gate 940. The output of NOR gate 940 is applied to the inverter 941, having its output applied to the input of inverter 942 and to the input of the NOR gate 943. The output of the inverter 942 provides the control signal I6B applied in the circuit of FIG. 8. The second input to NOR gate 943 is the output of the delay circuit 944, which has as input the signal 7X which is produced at the output of the NOR gate 945. The first input to the NOR gate 945 is the output of the NOR gate 940. The second input of the NOR gate 945 is the output of the delay circuit 946, which has as input the signal 6X generated at the output of the NOR gate 943. The output of the NOR gate 943 is applied to inverter 947 and inverter 948 in series which produces the clock signal P2. The output of the NOR gate 945 is applied to inverter 949 and inverter 950 in series which produces a clock signal P3.

The relationship between the signal CLK and the nonoverlapping four-phase clock signals P[1:4] is shown in FIG. 7 as mentioned above. The circuitry is arranged so that the phase of the transitions in the nonoverlapping four-phase clock signals P[1:4] are offset from one another, and switch in the sequence suitable to boost in transfer charge on the plurality of stages in the charge pump.

In an embodiment of the invention, the circuitry of FIGS. 8-10 is used for providing clock signals in the program/erase mode. The frequency control voltage produced in the circuit 805 of FIG. 8 is applied to increase and decrease the frequency of the clock signal CLK according to a function of the supply potential and temperature. In one embodiment, the function of the supply potential and temperature is an inverse relation to supply potential and substantially insensitive to changes in temperature. In this manner, as the supply potential changes, the output voltage and power provided by the charge pump can remain more constant for the program and erase operations on the device.

Figure 12:
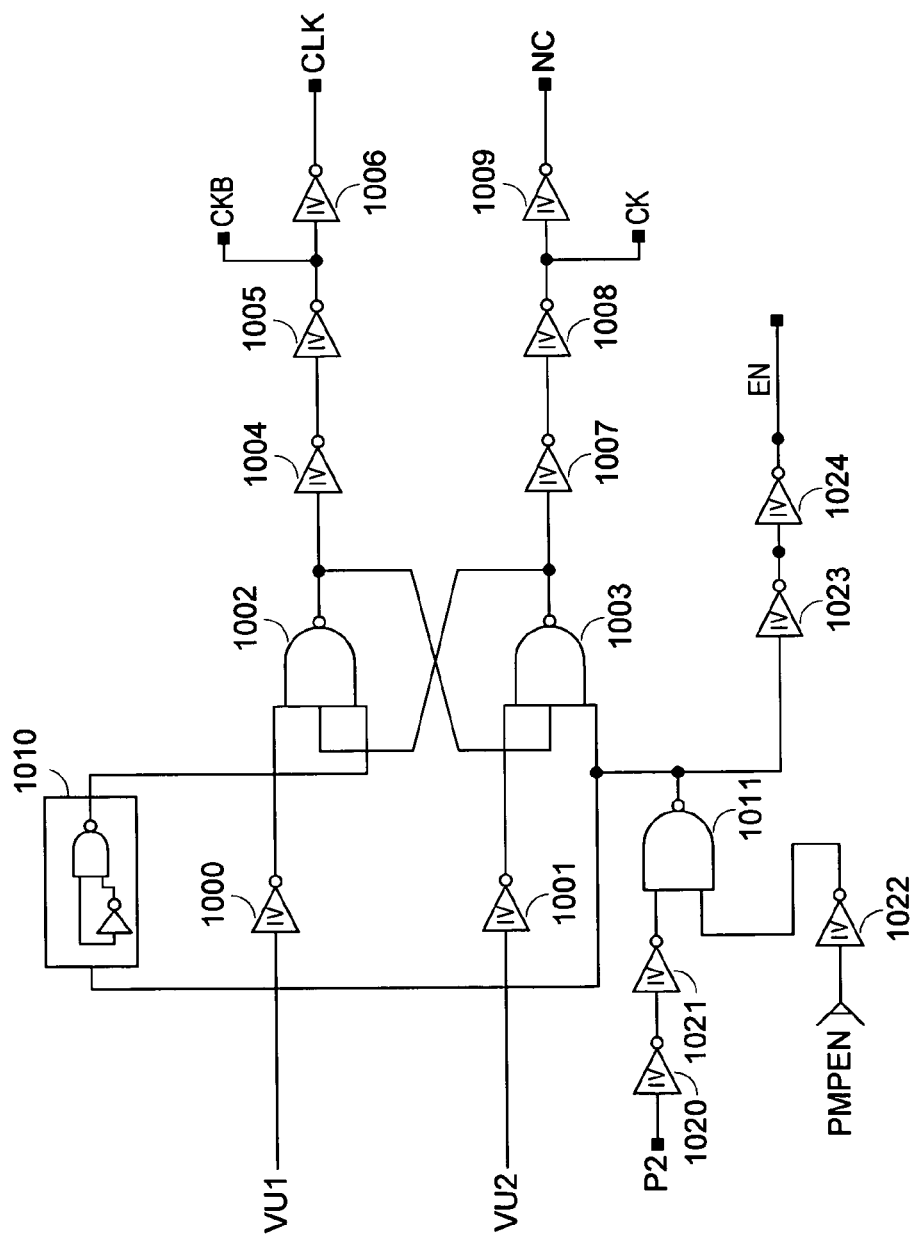
FIG. 12 illustrates output logic used in place of the logic of FIGS. 9 and 10 for producing a read and standby mode clock in one embodiment of the technology.

In an embodiment of the technology, the clock used during the read mode and standby mode is produced with a circuit like that of FIG. 8, with the circuits of FIGS. 9 and 10 replaced by the circuit of FIG. 12. VU1 (from a version the circuit of FIG. 8 implemented for the read and standby mode) is applied to the input of inverter 1000, the output of which is applied to a first input of a three-input NAND gate 1002. VU2 is applied to the input of inverter 1001, the output of which is applied to a first input of a three-input NAND gate 1003. The output of NAND gate 1002 is coupled to a second input of the NAND gate 1003. Likewise, the output of the NAND gate 1003 is coupled to a second input of the NAND gate 1002. The third input of the NAND gate 1002 is the output of the pulse generator 1010. The third input of the NAND gate 1003 is the control signal EN0 at the output of NAND gate 1011. The output of NAND gate 1002 is applied to a set of inverters 1004, 1005, 1006 arranged in series. The output of the inverter 1005 is the signal CKB. The output of NAND gate 1003 is applied to a set of inverters 1007, 1008, 1009 arranged in series. The output of the inverter 1008 is the signal CK. The output of inverter 1006 drives the probe point with the signal CLK. The output of inverter 1009 is unconnected. The signals CK and CKB are applied to a circuit like that shown in FIG. 11 to produce the four-phase nonoverlapping clocks P[1:4].

The enable circuitry for the logic of FIG. 12 is controlled by the signal PMPEN, which is produced at the output of a level detector, like level detector 51 of FIG. 2, when the output of the charge pump falls below a target threshold. Also, the clock signal P2 from the set of nonoverlapping clocks P[1:4] is fed back. Thus, the signal P2 is applied to the input of inverter 1020, which drives inverter 1021, having its output coupled to the input of the NAND gate 1011. The signal PMPEN is coupled to the input of inverter 1022, which has its output coupled to the input of the NAND gate 1011. The output EN0 of the NAND gate 1011 is applied to the third input of the three-input NAND gate 1003 as mentioned above. Also, it is coupled to the input of inverter 1023, which drives the input of inverter 1024. The output of the inverter 1023 is the control signal ENB fed back to the circuit of FIG. 8. The output of the inverter 1024 is the control signal EN, which is fed back to the circuit of FIG. 8. Thus, as long as the signal PMPEN is high, the circuitry is enabled. When the signal P2 goes high after PMPEN goes low, the circuitry is disabled. In this manner, the read and standby mode clock shuts off after low to high transitions of the clock signal P2.

Figure 13:
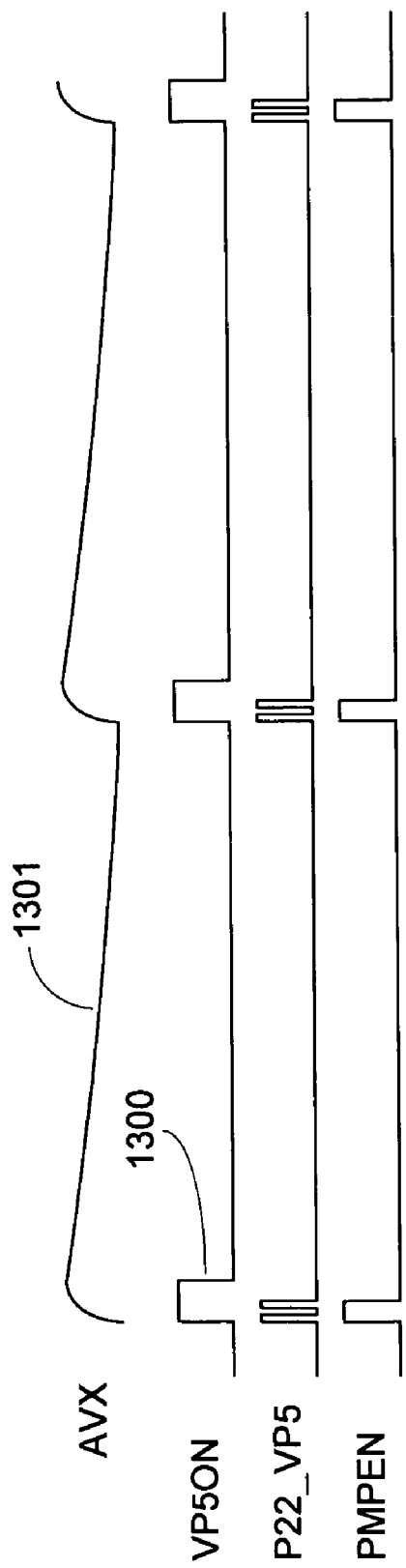
FIG. 13 is a timing diagram illustrating operation of the standby mode using the circuitry of FIG. 12.

FIG. 13 shows a timing diagram illustrating operation of the clock generator during the read and standby modes. During the standby mode, the control signal VP5ON is asserted by the control logic block 20 in response to the slow clock 21 resulting in the pulse 1300. If the PMPEN goes high during the interval, the clock signals are enabled to recharge the node AVX as illustrated on trace 1301 in the region over the pulse 1300. The clock signal P2 transitions normally during that interval. When the voltage on AVX reaches its desired threshold, the signal PMPEN goes low, and after the next low to high transition of P2, the clock for the charge pump is disabled. The voltage on node AVX will decay as indicated on trace 1301 until the next pulse of VP5ON. During active read operations, VP5ON is asserted on every address transition, and the signal PMPEN will be high more often, and the clock will be adapted, by controlling its frequency, to maintain signal voltage AVX as necessary.

Figure 14:
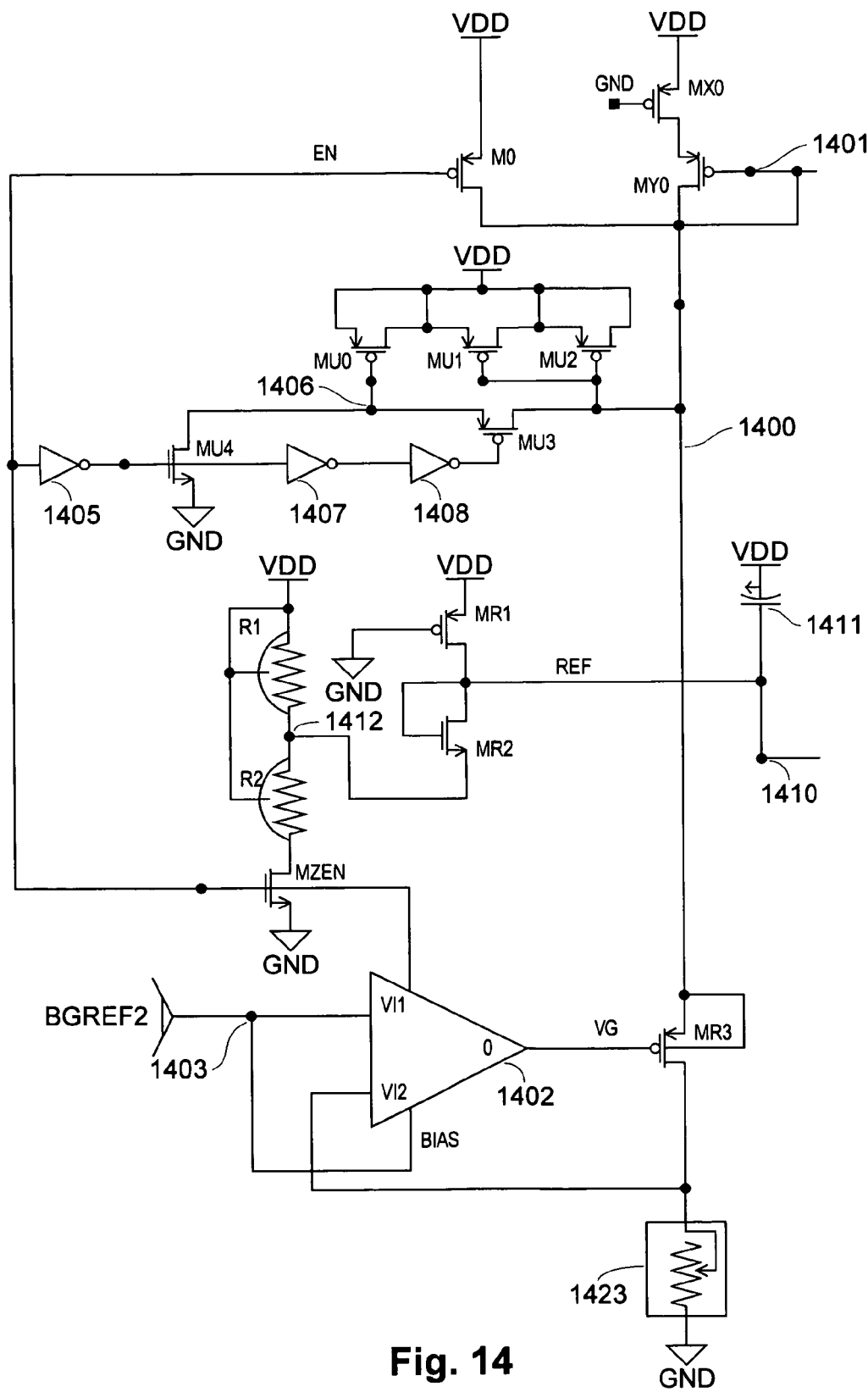
FIG. 14 illustrates a current mirror reference leg and frequency control circuit suitable for use with the circuitry of FIGS. 8-10, for producing a clock signal having a frequency according to a function having an inverse relation to changes in supply voltage and relatively independent of changes in temperature.

FIG. 14 illustrates an embodiment of a current mirror reference leg 800 and a frequency voltage control circuit 805, which can be used to implement a function of supply potential and temperature. In particular, the embodiment shown in FIG. 14 implements a frequency voltage control circuit that operates the circuitry of FIG. 8, according to a function having an inverse relation to changes in the supply potential, and which is relatively insensitive to changes in temperature.

The circuit in FIG. 14 includes reference leg 1400 for the current mirrors of FIG. 8. The reference voltage for the reference leg is provided on node 1401. The reference leg includes PMOS transistor MX0, PMOS transistor MY0, and PMOS transistor MR3, connected in series. The gate of transistor MX0 is coupled to ground, and always biased in an on condition. The gate of transistor MY0 is coupled to the node 1401, and to the drain of the transistor MY0. The transistor MR3 has its n-well coupled to its source and to node 1401, and its gate coupled to the output of a differential amplifier 1402. The drain of transistor MR3 is coupled via resistor 1423 to ground. Also, the drain of transistor MR3 is also coupled to one input of the differential amplifier 1402. A second input of the differential amplifier 1402 is a band gap reference voltage at node 1403. The band gap reference voltage at node 1403 is also applied to a bias terminal of the differential amplifier 1402. The differential amplifier 1402, as connected, operates to establish a constant current on the reference leg 1400. A PMOS transistor M0 has its drain coupled to the node 1401, and its source coupled to a source of the supply potential VDD. The gate of the transistor M0 is coupled to the control signal EN, which is fed back from the circuit shown in FIG. 10. The control signal EN likewise is applied to an enable input on the differential amplifier 1402.

The control signal EN is also applied to the input of inverter 1405, the output of which is coupled to the gate of NMOS transistor MU4. The source of transistor MU4 is coupled to ground, and the drain of transistor MU4 is coupled to the node 1406. The node 1406 is coupled to the gate of the capacitor configured PMOS transistor MU0, which has its source and drain coupled to a source of the supply potential VDD. The control signal EN is also coupled to the input of inverter 1407, which has its output coupled to the input of inverter 1408. The output of inverter 1407 is coupled to the gate of PMOS transistor MU3, which has its source coupled to the node 1406, and its drain coupled to the node 1401. The node 1401 is coupled to the gate of capacitor configured PMOS transistors MU1 and MU2, which have their source and drain terminals coupled to a source of the supply potential VDD. Thus, when the control signal EN is low, the node 1406 is pulled toward ground. When the control signal EN is high, the node 1406 is coupled to the node 1401 via the transistor MU3. This circuit including transistor MU3 is designed to adjust the capacitance on node 1401, when the circuit turns on in response to the EN signal, while also stabilizing operation after it is turned on.

The frequency control voltage REF is applied at node 1410 by the circuitry including resisters R1 and R2 arranged as a voltage divider, NMOS transistor MZEN, NMOS transistor MR2 and PMOS transistor MR1, with the stabilizing capacitor 1411. The resisters R1 and R2 are arranged in series between a source of the supply potential VDD and the drain of transistor MZEN. The source of transistor MZEN is connected to ground. The gate of transistor MZEN is connected to the control signal EN. The node 1412 between resisters R1 and R2 is coupled to the source of transistor MR2, which has its gate and drain coupled to the node 1410. The drain of transistor MR1 is coupled to the node 1410, while its source is coupled to a source of the supply potential VDD, and its gate is coupled to ground. The stabilizing capacitor 1411 is coupled between the node 1410 and a source of this potential. Thus, the voltage REF at the node 1410 has a value that is determined by the voltage at node 1412, which increases as the supply potential increases, and decreases as the supply potential decreases. When this voltage REF is applied as the reference voltage on the gates of transistors MZ1, MZ2, MZ5 and MZ6, in the circuit shown in FIG. 8, the clock frequency becomes an inverse function of the voltage REF, and thereby an inverse function of changes in the supply potential VDD. For example, when REF is higher, a higher trip voltage is set for turning off transistors MZ1, MZ2, MZ5 and MZ6, which requires a longer time for charge to build up on the capacitors MC1, MC2, MC5 and MC6, and thereby causing a lower frequency clock. Likewise when REF is lower, a lower trip voltage is set for turning off transistors MZ1, MZ2, MZ5 and MZ6, which requires a shorter time for charge to build up on the capacitors MC1, MC2, MC5 and MC6, and thereby causing a higher frequency clock. In the circuit shown in FIG. 14, the voltage REF is relatively insensitive to changes in temperature, as is the resulting clock frequency.

Figure 15:
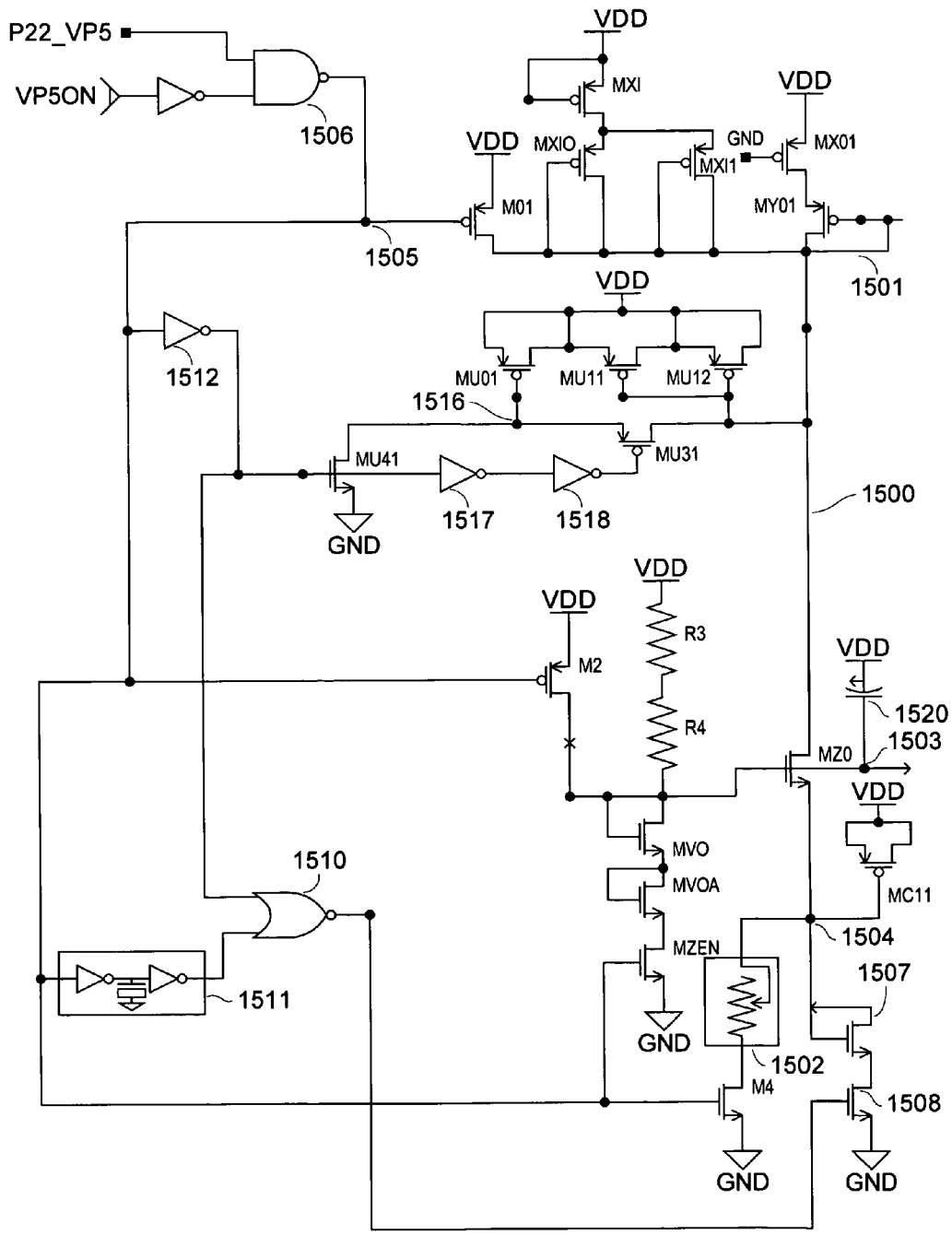
FIG. 15 illustrates a current mirror reference leg and frequency control circuit suitable for use with the circuitry of FIG. 8 with FIG. 12, for producing a clock signal having a frequency according to a function having a direct relation to changes in temperature and relatively independent of changes in supply voltage.

FIG. 15 illustrates a reference leg and frequency control voltage circuit suitable for use with the circuitry of FIG. 8, implementing a reference voltage that is relatively insensitive to changes in the supply potential, and has a direct relation to changes in temperature. The reference leg 1500 includes PMOS transistors MX01 and MY01, and NMOS transistors MZ0 and M4 and resister 1502. The gate of transistor MX01 is coupled to ground, and always biased in on condition. The gate of transistor MY01 is coupled to the node 1501, and to the drain of the transistor MY01. Transistor MZ0 has its drain coupled to the node 1501, its gate coupled to the node 1503, and its source coupled to the node 1504. The resister 1502 is connected between the node 1504 and the drain of transistor M4, which has its source coupled to ground, and its gate coupled to the control signal on node 1505, produced at the output of NAND gate 1506. Also, a capacitor configured PMOS transistor MC11 has its gate connected to the node 1504, and its source and drain coupled to a source of the supply potential VDD. NMOS transistors 1507 and 1508 are connected in series between the node 1504 and ground. The gate and drain of transistor 1507 are connected to the node 1504. The source of transistor 1507 is coupled to the drain of transistor 1508. The source of transistor 1508 is connected to ground. The gate of transistor 1508 is connected to the control signal at the output of NOR gate 1510. Inputs to NOR gate 1510 are the output of delay circuit 1511 which has its input connected to the node 1505, and the output of inverter 1512 which has its input connected to the node 1505. Thus the signal at the output of NOR gate 1510 comprises a pulse which is generated on low to high transitions of the signal on node 1505. This induces a current boost in the reference leg 1500 during initialization.

Node 1501 is also coupled to circuitry including PMOS transistors MXI, MXI0 and MXI1. Transistor MXI has its gate and source connected to a source of the supply potential VDD, and its drain connected to the sources of transistors MXI0 and MXI1. The gates and drains of transistors MXI0 and MXI1 are coupled to the node 1501.

Also the PMOS transistor M01 is connected with its drain coupled at node 1501, and its source connected to a source of the supply potential VDD. The gate of transistor M0 is connected to the control signal at node 1505.

The control signal at node 1505 is generated by the NAND gate 1506. The first input to the NAND gate 1506 is the clock signal P2, and the second input to the NAND gate 1506 is the output of inverter 1515, which receives on its input the control signal VP5ON indicating the read or standby mode.

The output of inverter 1512 is coupled to the gate of NMOS transistor MU41. The source of transistor MU41 is coupled to ground, and the drain of transistor MU41 is coupled to the node 1516. The node 1516 is coupled to the gate of the capacitor configured PMOS transistor MU01, which has its source and drain coupled to a source of the supply potential VDD. The control signal at the output of inverter 1512 is also coupled to the input of inverter 1517, which has its output coupled to the input of inverter 1518. The output of inverter 1517 is coupled to the gate of PMOS transistor MU31, which has its source coupled to the node 1516, and its drain coupled to the node 1501. The node 1501 is coupled to the gate of capacitor configured PMOS transistors MU11 and MU21, which have their source and drain terminals coupled to a source of the supply potential VDD. Thus, when the control signal on node 1505 is low, the node 1516 is pulled toward ground. When the control signal on node 1505 is high, the node 1516 is coupled to the node 1501 via the transistor MU31. This circuit including transistor MU31 is designed to adjust the capacitance on the node 1501 when the reference leg 1500 turns on in response to the control signal on node 1505, while also stabilizing operation after it is turned on.

The voltage on node 1503 is set at about 2 times the threshold for diode-configured NMOS transistors MV0 and MV0A, by the circuitry including PMOS transistor M2, NMOS transistors MV0, MV0A and MZEN1, and is stabilized by the capacitor 1520 connected from the node 1503 to a source of the supply potential VDD. Alternative embodiments use other numbers of diodes or diode-configured transistors. The diodes or diode configured transistors will have a voltage drop across them which goes down as temperature rises. Resisters R3 and R4 are connected in series between a source of the supply potential VDD and the node 1503. Likewise, transistor M2 is coupled between a source of the supply potential VDD and the node 1503. The gate of the transistor M2 is coupled to the control signal on node 1505. Transistor MV0 has its gate and drain coupled together, and its source coupled to the gate and drain of the transistor MV0A. The source of transistor MV0A coupled to the drain of transistor MZEN1. The gate of transistor MZEN1 connected to the control signal node 1505, and its source is connected to ground. The voltage therefore on the node 1503 is determined by the voltage drop across the series of transistors MV0, MV0A and MZEN (about twice the threshold drop across diode configured NMOS transistors MV0 and MV0A). This voltage drop is relatively independent of the supply potential VDD, and changes with temperature slightly. As the temperature increases, the threshold voltage drop across diode connected transistors MV0 and MV0A slightly decreases, and vice versa. Thus, as applied to the circuitry in FIG. 8, as temperature increases, the trip point on the gates of transistors MZ1, MZ2, MZ5 and MZ6 goes down, speeding up the clock, and vice versa.

Although the example circuits shown in FIG. 14 and FIG. 15 can be applied to achieve functions of supply potential and temperature as described above, a wide variety of other circuits can be applied, including for example a class of circuits known as PTAT (proportional to absolute temperature) can be used for implementing functions of temperature. Also, a variety of clock rates can be generated by the adjustment of components in the circuitry, including for example by increasing or decreasing the size of the capacitors on the current mirror legs in FIG. 8.

Figure 16:
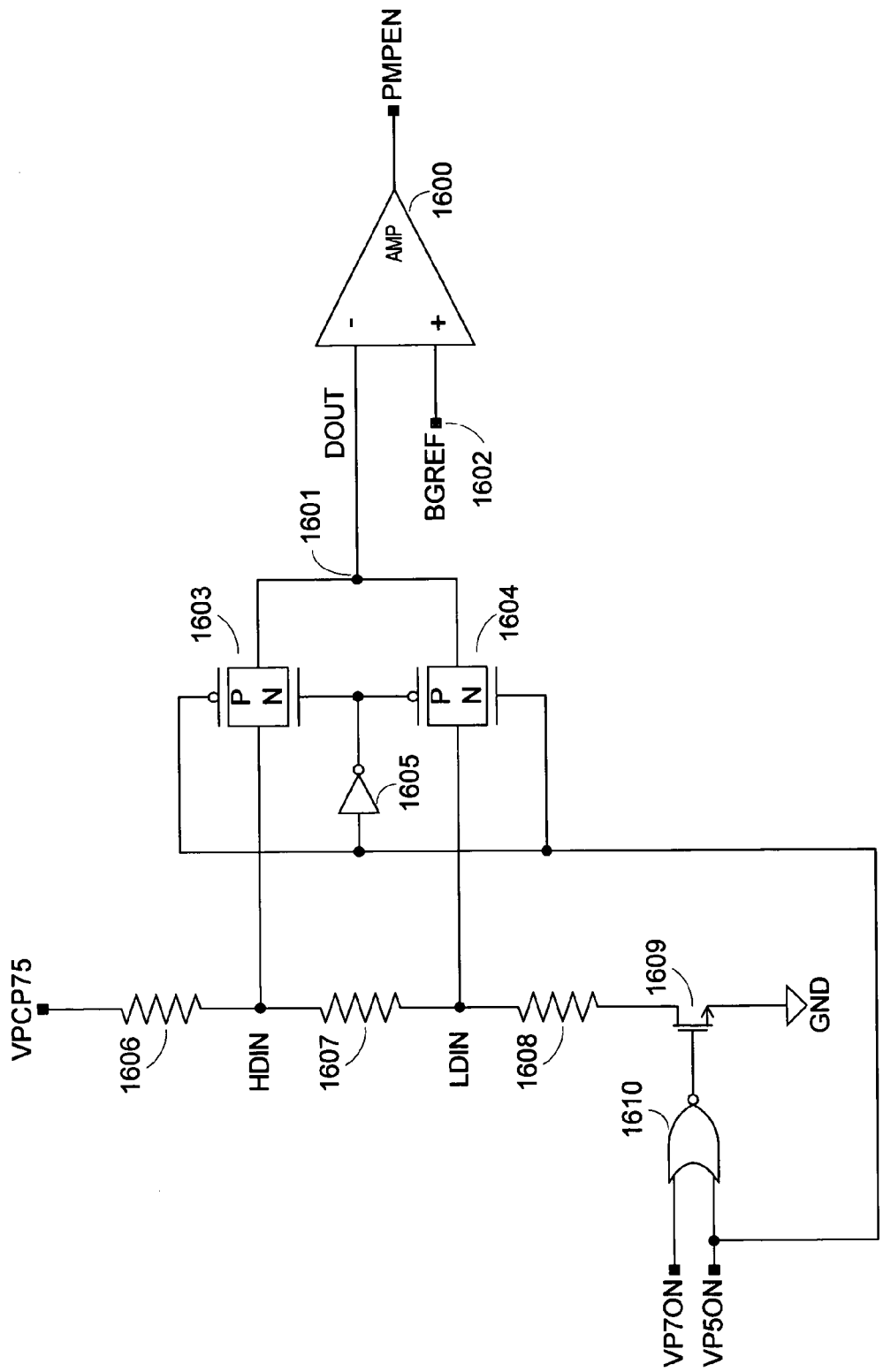
FIG. 16 illustrates an output level detector suitable for use with the two-mode charge pump of FIG. 2.

The circuit in FIG. 2 includes a detector which operates for both the read and program/erase modes. One representative implementation of such a detector is shown in FIG. 16. The circuit includes a comparator 1600 which compares the voltage on node 1601 to a stable reference voltage 1602, such as a band gap reference. Voltage on node 1601 is provided at the output of the multiplexer comprising transfer gates 1603 and 1604, which are controlled by the signal VP5ON and the output of inverter 1605. The inputs to the transfer gates 1603 and 1604 include the reference voltages HDIN and LDIN respectively, which are produced by the voltage divider including resisters 1606, 1607 and 1608, connected in series between a source of the supply potential VDD and the drain of transistor 1609. The source of transistor 1609 is coupled to ground. The gate of transistor 1609 is coupled to the output of the OR gate 1610. Inputs to OR gate 1610 include the control signals VP7ON and VP5ON. Thus, the trip point for the detector is set by the multiplexer to detect a high-voltage output when VP5ON is low, and to detect a low voltage output when VP5ON is high.

Figure 17:
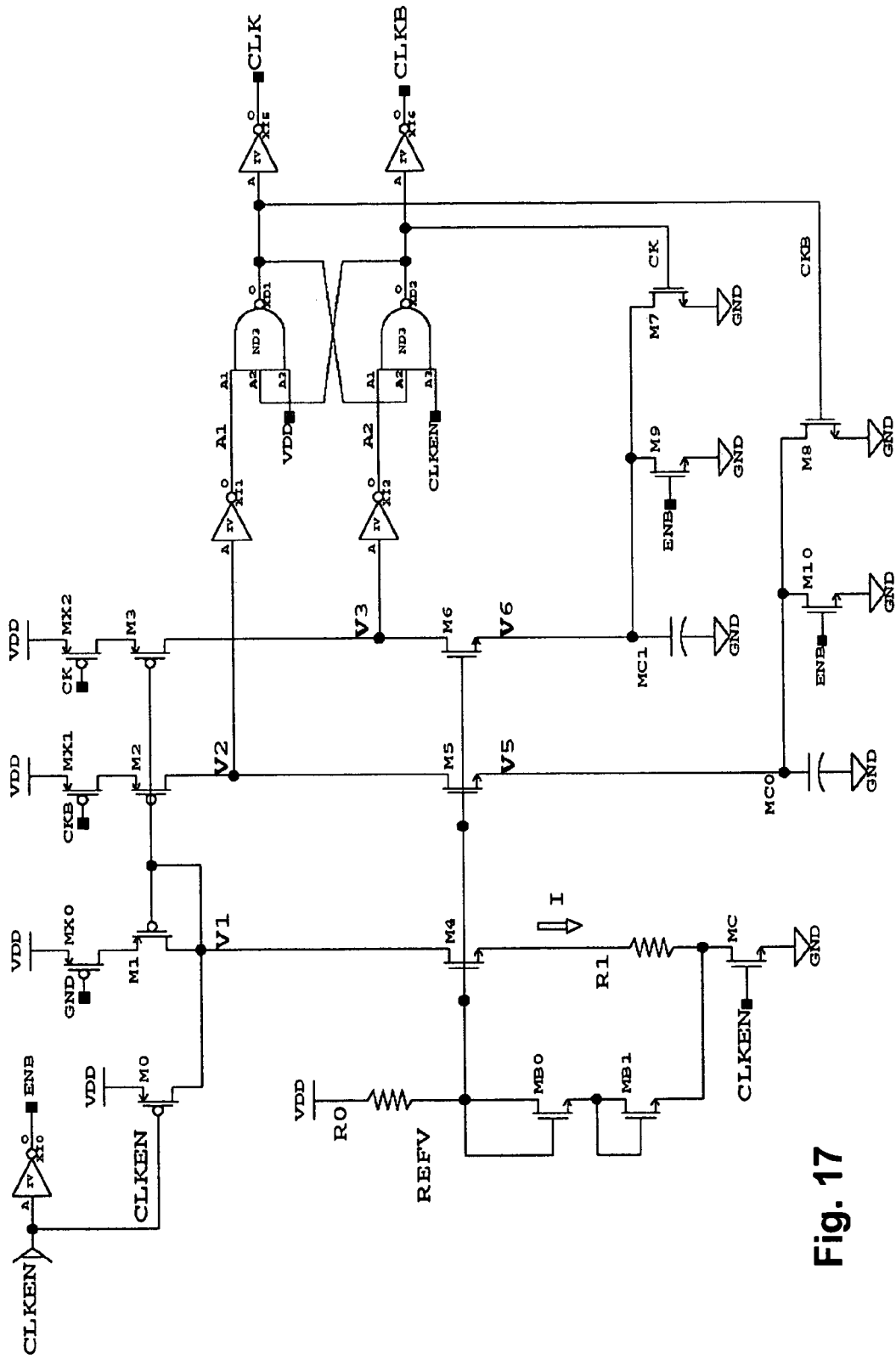
FIG. 17 illustrates an alternative clock generator for a clock signal having according to a function relatively independent of changes in supply voltage.

Alternative clock sources are described with reference to FIGS. 17-19. FIG. 17 illustrates a clock generator that produces the output clock CLK and CLKB as a function which is relatively independent of fluctuations in the supply voltage VDD. The clock generator includes a reference leg 1700 which produces a reference current I, and generates the reference voltage at node V1 for a current mirror circuit. Two output legs 1701 and 1702 of the current mirror circuit produce voltages at nodes V2 and V3. The reference leg 1700 includes PMOS transistors 1703 and 1704 which are connected in series between the supply voltage and the node V1, NMOS transistor 1705, resistor 1706 and NMOS transistor 1707. The gate of transistor 1703 is coupled to ground. The gate of transistor 1704 is connected to the node V1, and to its drain. Transistor 1705 is connected in series between the node V1 and the resistor 1706, and has its gate connected to the node REFV. Transistor 1707 is connected between the resistor 1706 and ground. The gate of transistor 1707 is connected to the control signal CLKEN. PMOS transistor 1708 is connected between the node V1 and the supply potential. The gate of transistor 1708 is connected to the control signal CLKEN. Inverter 1709 has the control signal CLKEN on its input, and produces the signal ENB. The voltage on node REFV is produced by the circuit including the resistor 1710, NMOS transistor 1711, and NMOS transistor 1712. The transistors 1711 and 1712 are diode-configured, with their respective gates and drains connected, and arrange in series between the node REFV and the drain of transistor 1707. Resistor 1710 is connected between the supply potential and the node REFV. Thus the reference leg 1700 is enabled by the signal CLKEN, and generates a current I, which have the magnitude which is a function of the voltage on the node REFV, which is dominated by the voltage drop across the NMOS transistors to 1711 and 1712. Thus, the magnitude of the current I is relatively independent of the supply potential.

The output leg 1701 includes PMOS transistors 1720 and 1721, NMOS transistor 1722, capacitor 1723, and NMOS transistors 1740 and 1741. Transistors 1720 and 1721 are connected in series between the supply potential and the node V2. Transistor 1722 is connected between the node V2 and node V5 at a first terminal of the capacitor 1723. The other terminal of the capacitor 1723 is connected to ground. Transistors 1740 and 1741 are connected between the node V5 and ground. The gate of transistor 1720 is connected to the fed back clock signal CKB from the output of NAND gate 1732. The gate of transistor 1721 is connected to the node V1. The gate of transistor 1722 is connected to the node REFV. The gate of transistor 1740 is connected to the control signal ENB, and the gate of transistor 1741 is connected to the fed back clock signal CKB.

The output leg 1702 includes PMOS transistors 1725 and 1726, NMOS transistor 1727, capacitor 1728, and NMOS transistors 1750 and 1751. Transistors 1725 and 1726 are connected in series between the supply potential and the node V3. Transistor 1727 is connected between the node V3 and node V6 at a first terminal of the capacitor 1728. The other terminal of the capacitor 1728 is connected to ground. Transistors 1750 and 1751 are connected between the node V6 and ground. The gate of transistor 1725 is connected to the fed back clock signal CK from the output of NAND gate 1733. The gate of transistor 1726 is connected to the node V1. The gate of transistor 1727 is connected to the node REFV. The gate of transistor 1750 is connected to the control signal ENB, and the gate of transistor 1751 is connected to the fed back clock signal CK.

This the circuit operates in a manner like that described above with reference to FIG. 8, in which the capacitors 1723 and 1728 are charged up while the respective output legs are enabled, to the point that the transistors 1722 and 1727 respectively are turned off causing the voltages on the nodes V2 and V3 to quickly reached the trip point of the inverters 1730 and 1731. The first and second legs are alternately enabled by the fed back clock signals CKB and CK, and a clock signal having a frequency which is a function of the magnitude of the current I is produced. The output of the inverters 1730 and 1731 are applied as inputs to respective three-input NAND gates 1732 and 1733. A second input to the NAND gate 1732 is the output of NAND gate 1733. The third input to the NAND gate 1732 is the supply potential. A second input to the NAND gate 1733 is the output of the man gate 1732. A third input to the NAND gate 1733 is the control signal CLKEN. The outputs of the NAND gates 1732 and 1733 are applied to respective inverter's 1734 and 1735 to provide the clock signals CLK and CLKB having a frequency which is a function of the magnitude of the current I.

Figure 18:
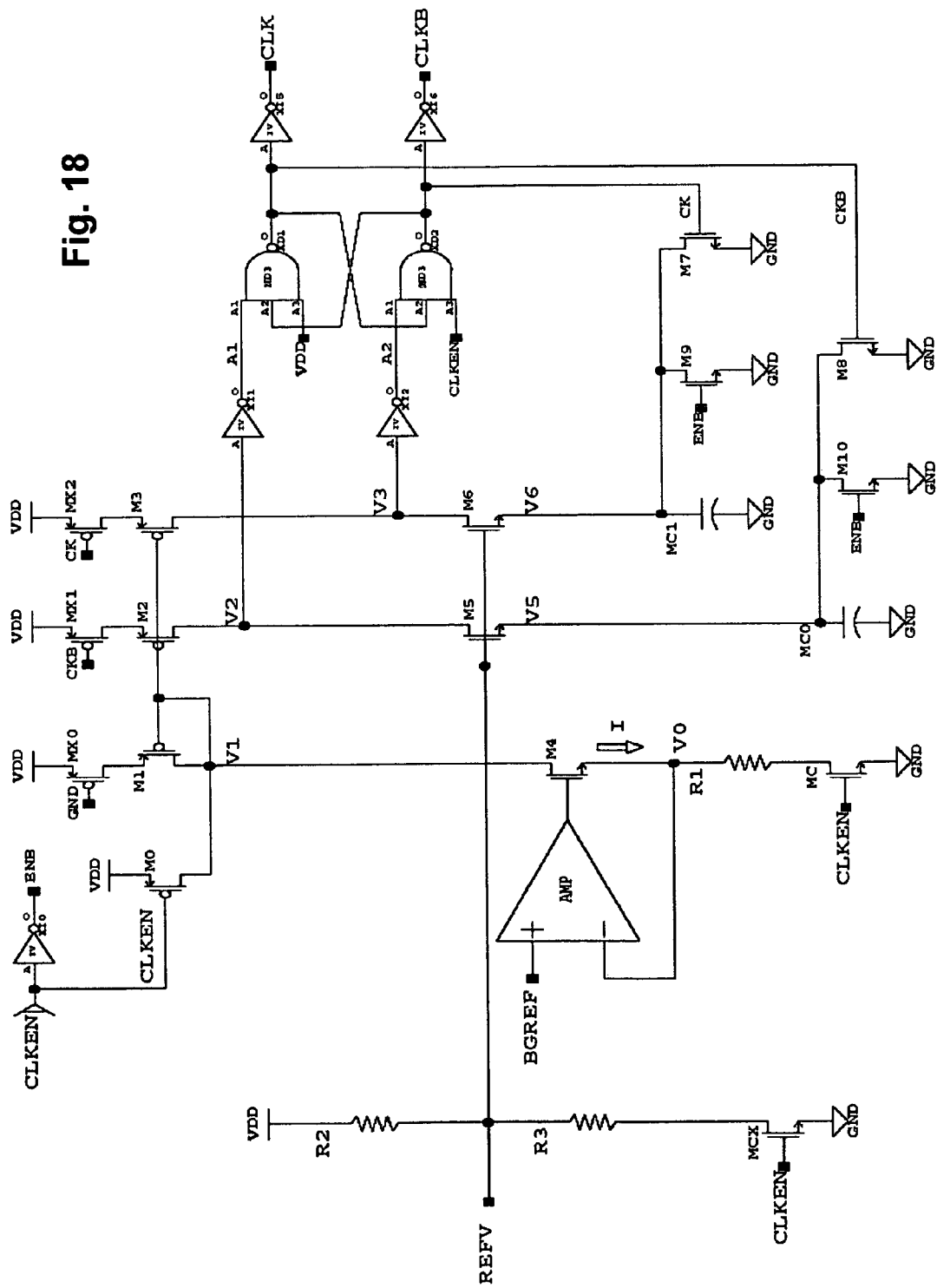
FIG. 18 illustrates an alternative clock generator for a clock signal having according to a function having an inverse relation to changes in supply voltage.

FIG. 18 illustrates a clock generator that produces the output clock CLK and CLKB as a function which is inversely related to fluctuations in the supply voltage VDD. The clock generator includes a reference leg 1800 which produces a reference current I, and generates the reference voltage at node V1 for a current mirror circuit. Two output legs 1801 and 1802 of the current mirror circuit are implemented in the same way as the reference legs 1701 and 1702 of FIG. 17, and not described herein. The reference leg 1800 includes PMOS transistors 1803 and 1804 which are connected in series between the supply voltage and the node V1, NMOS transistor 1805, resistor 1806 and NMOS transistor 1807. The gate of transistor 1803 is coupled to ground. The gate of transistor 1804 is connected to the node V1, and to its drain. Transistor 1805 is connected in series between the node V1 and the resistor 1806, and has its gate connected to the node REFV. Transistor 1807 is connected between the resistor 1806 and ground. The gate of transistor 1807 is connected to the control signal CLKEN. PMOS transistor 1808 is connected between the node V1 and the supply potential. The gate of transistor 1808 is connected to the control signal CLKEN. Inverter 1809 has the control signal CLKEN on its input, and produces the signal ENB. The gate of transistor 1805 receives a voltage from the output of operational amplifier 1810, which has a band gap reference voltage on its + input, and the voltage on the source of transistor 1805 on its − input. This establishes a stable reference current I on the reference leg 1800. The voltage on node REFV, that is applied to the output legs 1801 and 1802, is produced by a voltage divider circuit including the resistor 1811, resistor 1812, and NMOS transistor 1813. Resistor 1811 is connected in series between the supply potential and node REFV. Resistor 1812 is connected in series between the node REFV and the transistor 1813. The transistor 1813 is connected between the resistor 1812 and ground. The gate of transistor 1813 is connected to the control signal CLKEN. Thus the reference leg 1800 is enabled by the signal CLKEN, and generates a stable reference current I. the output legs are controlled by the voltage on node REFV, which has the magnitude which is a function of the the supply potential. As the supply potential increases, the time required for the capacitors on the output legs to charge up to the trip voltages increases, and the clock rate slows down, and vice versa. Thus, the clock signals CLK and CLKB produced by the circuit in FIG. 18 have a frequency which has an inverse relation to fluctuations in the supply potential.

Figure 19:
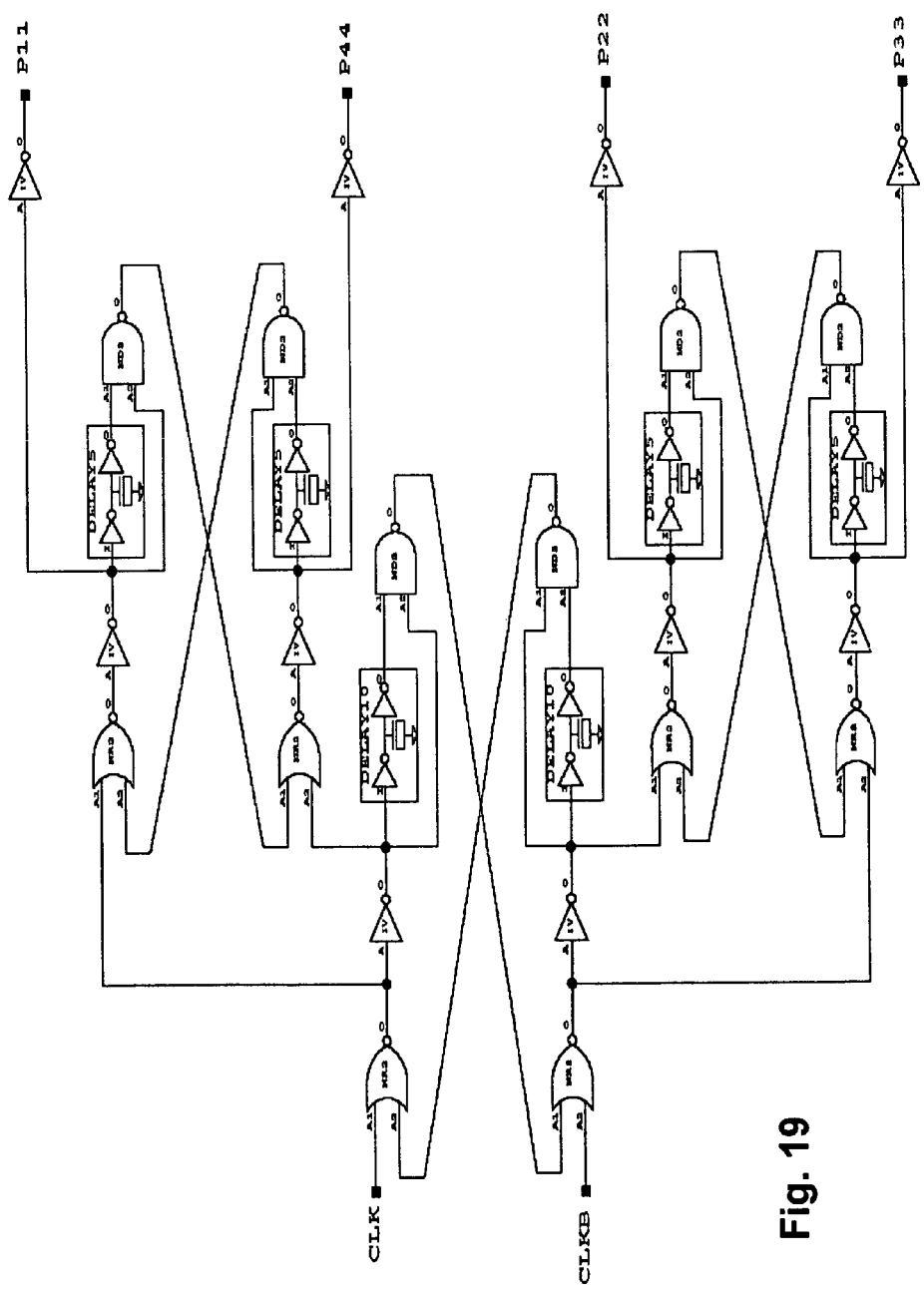
FIG. 19 illustrates logic for converting the clock signals of the clock generators of FIGS. 17 and 18 into a four phase clock suitable for driving the multistage charge pump of FIG. 4

FIG. 19 illustrates a circuit suitable for producing the four-phase nonoverlapping clock signals P[11:44] based on the clock signals CLK and CLKB produced by the circuits of FIGS. 17 and 18. The clock signal CLK is applied as an input to NOR gate 1900. A second input to the NOR gate 1900 is the output of the NAND gate 1925. The output of the NOR gate 1900 is applied as an input to NOR gate 1901, and as an input to the inverter 1902. The output of the inverter 1902 is applied as an input to the NOR gate 1903, as an input to the delay circuit 1904, and as an input to the NAND gate 1905. The output of the delay circuit 1904 is applied as a second input to the NAND gate 1905. The output of the NAND gate 1905 is a pulse having a width defined by the delay circuit 1904. Six thoughts circuit The output of the NOR gate 1901 is applied through inverter 1906 to input of inverter 1907, which provides as output the clock signal P11.

The output of inverter 1906 is also applied to the delay circuit 1908 and as an input to the NAND gate 1909. The output of the delay circuit 1908 is applied as a second input to the NAND gate 1909, the output of which is a pulse having a width defined by the delay circuit 1908. The output of the NAND gate 1909 is applied as a second input to the NOR gate 1903. The output of the NOR gate 1903 is applied to the inverter 1910. The output of the inverter 1910 is applied as an input to the delay circuit 1911 and as an input to the NAND gate 1912. The output of the delay circuit 1911 is applied as a second input to the NAND gate 1912. The output of the NAND gate 1912 is a pulse having a width defined by the delay circuit 1911, and provided a second input to the NOR gate 1901. The output of the inverter 1910 is also applied to the input of inverter 1913. The output of the inverter 1913 is the clock signal P44.

The clock signal CLKB is applied as an input to NOR gate 1920. A second input to the NOR gate 1920 is the output of the NAND gate 1905. The output of the NOR gate 1920 is applied as an input to NOR gate 1921, and as an input to the inverter 1922. The output of the inverter 1922 is applied as an input to the NOR gate 1923, as an input to the delay circuit 1924, and as an input to the NAND gate 1925. The output of the delay circuit 1924 is applied as a second input to the NAND gate 1925. The output of the NAND gate 1925 is a pulse having a width defined by the delay circuit 1924. The output of the NOR gate 1921 is applied through inverter 1926 to input of inverter 1927, which provides as output the clock signal P33.

The output of inverter 1926 is also applied to the delay circuit 1928 and as an input to the NAND gate 1929. The output of the delay circuit 1928 is applied as a second input to the NAND gate 1929, the output of which is a pulse having a width defined by the delay circuit 1928. The output of the NAND gate 1929 is applied as a second input to the NOR gate 1923. The output of the NOR gate 1923 is applied to the inverter 1930. The output of the inverter 1930 is applied as an input to the delay circuit 1931 and as an input to the NAND gate 1932. The output of the delay circuit 1931 is applied as a second input to the NAND gate 1932. The output of the NAND gate 1932 is a pulse having a width defined by the delay circuit 1931, and provided a second input to the NOR gate 1921. The output of the inverter 1930 is also applied to the input of inverter 1933. The output of the inverter 1933 is the clock signal P22.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for operating a multistage charge pump in a first mode and in a second mode, comprising:
   configuring the multistage charge pump so that N stages each including a supply node are enabled in the first mode, and so that less than N stages are enabled in the second mode including allowing the supply node in enabled stages to fluctuate at a level above a supply potential, and coupling the supply node in a disabled stage to the supply potential without voltage loss of a threshold voltage drop, and thereby decoupling the disabled stage from preceding stages in the plurality of stages;
   producing a first set of clock signals having a first clock frequency which changes according to a first function;
   producing a second set of clock signals having a second clock frequency which changes according to a second function
   wherein at least one of the first function and the second function is dependent on at least a power supply voltage, and at least one of the first function and the second function is dependent on at least temperature; and
   applying the first set of clock signals to a multistage charge pump to produce a charge pump output voltage in the first mode of operation and applying the second set of clock signals to a multistage charge pump to produce a charge pump output voltage in the second mode of operation.

2. The method of claim 1, further comprising:
   generating, in the first mode, a first clock signal from a first clock generator; and
   generating, in the second mode, a second clock signal from a second clock generator.

3. An integrated circuit device, comprising:
   a memory having a first mode for at least one of programming and erasing and a second mode for reading;
   charge pump circuitry coupled to a node in the memory, operable in the first mode and the second mode, the charge pump circuitry including a plurality of charge pump stages, responsive to a plurality of clock signals;
   enable circuitry to enable all the charge pump stages in the plurality of charge pump stages in the first mode, and to enable less than all but at least one of the charge pump stages in the plurality of charge pump stages in the second mode
   wherein the enable circuitry includes a plurality of precharge circuits coupled to respective charge pump stages in the plurality of charge pump stages, at least one precharge circuit in the plurality of precharge circuits having a first state allowing a node on the corresponding charge pump stage to fluctuate at a level above the supply potential, and a second state coupling the node to a supply potential without inducing voltage loss of a threshold voltage drop, and thereby decoupling the corresponding stage from preceding stages in the plurality of stages; and
   a clock source including a plurality of clock generators, the clock source providing the plurality of clock signals;
   wherein the clock source includes a clock circuit including components tending to cause the frequency of the plurality of clock signals to change according to a first function, where the first function has an inverse relation with change in supply potential and is relatively unresponsive to changes in temperature
   circuitry providing control signals to said at least one precharge circuit and to the clock source, so that in the first mode the at least one precharge circuit is in the first state, and in the second mode the at least one precharge circuit is in the second state.

4. The integrated circuit of claim 3, wherein the at least one precharge circuit includes components which transfer the supply potential to the supply node without inducing significant voltage loss.

5. The integrated circuit of claim 3, wherein the at least one precharge circuit includes:
   a first PMOS transistor having a source terminal coupled to a source of the supply potential, a drain terminal coupled to said node on the corresponding charge pump stage, and a gate;
   a second PMOS transistor having a source terminal coupled to said node on the corresponding charge pump stage, a drain terminal coupled to the gate of the first PMOS transistor, and a gate coupled to a control node; and an NMOS transistor having a source terminal coupled to a reference supply, a drain terminal coupled to the gate of the first PMOS transistor, and a gate coupled to the control node.

6. The integrated circuit of claim 3, wherein the at least one precharge circuit comprises all of the precharge circuits in the plurality of precharge circuits, and the control signals include a first set of signals coupled to a first set of precharge circuits and a second set of signals coupled to a second set of precharge circuits, the first set of precharge circuits including a precharge circuit coupled to the supply node of an intermediate stage adjacent to a first stage in the plurality of charge pump stages, and a second signal coupled to the supply node of another intermediate stage preceding a last charge pump stage in the plurality of charge pump stages, so that the control signals are operable to enable all the charge pump stages in the plurality of charge pump stages during the first mode, and operable to enable a subset of the charge pump stages in the plurality of charge pump stages in the second mode.

7. The integrated circuit of claim 3, wherein the multistage charge pump comprises:
   a plurality of stages including a first stage and a last stage, with one or more intermediate stages arranged in series between the first and last stages;
   each stage in the plurality of stages including a supply node, an output node, and a pass gate, the pass gate having a first state coupling the supply node to the output node, and a second state blocking charge flow from the output node back to the supply node;
   the first stage having its supply node coupled to a supply voltage;
   the intermediate stages having respective supply nodes coupled to the output nodes of the respective preceding stages in the plurality of stages; and
   the last stage having its supply node coupled to the output node of its preceding stage in the plurality of stages, and its output node coupled to a load;
   a first plurality of charge boosting circuits coupled to the supply nodes of the intermediate stages and of the last stage and to clock signals in the plurality of clock signals; and
   a second plurality of charge boosting circuits coupled to the pass gates of the first stage, the intermediate stages, and the last stage and to clock signals in the plurality of clock signals.

8. The integrated circuit device of claim 3, wherein the clock source comprises:
   a first clock generator generating a first clock signal of the plurality of clock signals in the first mode; and
   a second clock generator generating a second clock signal of the plurality of clock signals in the second mode.

9. An integrated circuit device, comprising:
   a memory having a first mode for at least one of programming and erasing and a second mode for reading;
   charge pump circuitry coupled to a node in the memory, operable in the first mode and the second mode, the charge pump circuitry including a plurality of charge pump stages, responsive to a plurality of clock signals;
   enable circuitry to enable all the charge pump stages in the plurality of charge pump stages in the first mode, and to enable less than all but at least one of the charge pump stages in the plurality of charge pump stages in the second mode
   wherein the enable circuitry includes a plurality of precharge circuits coupled to respective charge pump stages in the plurality of charge pump stages, at least one precharge circuit in the plurality of precharge circuits having a first state allowing a node on the corresponding charge pump stage to fluctuate at a level above the supply potential, and a second state coupling the node to a supply potential without inducing voltage loss of a threshold voltage drop, and thereby decoupling the corresponding stage from preceding stages in the plurality of stages;
   a clock source including a plurality of clock generators, the clock source providing the plurality of clock signals,
   wherein the clock source includes a clock circuit including components tending to cause the frequency of the plurality of clock signals to change according to a second function, where the second function is relatively unresponsive to changes in supply potential; and
   circuitry providing control signals to said at least one precharge circuit and to the clock source, so that in the first mode the at least one precharge circuit is in the first state, and in the second mode the at least one precharge circuit is in the second state.

10. An integrated circuit device, comprising:
    a memory having a first mode for at least one of programming and erasing and a second mode for reading;
    charge pump circuitry coupled to a node in the memory, operable in the first mode and the second mode, the charge pump circuitry including a plurality of charge pump stages, responsive to a plurality of clock signals;
    enable circuitry to enable all the charge pump stages in the plurality of charge pump stages in the first mode, and to enable less than all but at least one of the charge pump stages in the plurality of charge pump stages in the second mode
    wherein the enable circuitry includes a plurality of precharge circuits coupled to respective charge pump stages in the plurality of charge pump stages, at least one precharge circuit in the plurality of precharge circuits having a first state allowing a node on the corresponding charge pump stage to fluctuate at a level above the supply potential, and a second state coupling the node to a supply potential without inducing voltage loss of a threshold voltage drop, and thereby decoupling the corresponding stage from preceding stages in the plurality of stages;
    a clock source including a plurality of clock generators, the clock source providing the plurality of clock signals,
    wherein the clock source includes a clock circuit including components tending to cause the frequency of the plurality of clock signals to change according to a second function, where the second function is relatively unresponsive to changes in supply potential and has a direct relation to changes in temperature; and
    circuitry providing control signals to said at least one precharge circuit and to the clock source, so that in the first mode the at least one precharge circuit is in the first state, and in the second mode the at least one precharge circuit is in the second state.

11. A charge pump apparatus, comprising:
    a plurality of stages including a first stage and a last stage, with one or more intermediate stages arranged in series between the first and last stages;
    each stage in the plurality of stages including a supply node, an output node, and a pass gate, the pass gate having a first state coupling the supply node to the output node, and a second state blocking charge flow from the output node back to the supply node;
    the first stage having its supply node coupled to a supply voltage;

the intermediate stages having respective supply nodes coupled to the output nodes of the respective preceding stages in the plurality of stages; and the last stage having its supply node coupled to the output node of its preceding stage in the plurality of stages, and its output node coupled to a load;

a first plurality of charge boosting circuits coupled to the supply nodes of the intermediate stages and of the last stage;

a second plurality of charge boosting circuits coupled to the pass gates of the first stage, the intermediate stages, and the last stage;

a plurality of precharge circuits coupled to the supply nodes of the intermediate stages and the last stages, at least one precharge circuit in the plurality of precharge circuits having a first state allowing the supply node to fluctuate at a level above a supply potential, and a second state coupling the supply node to the supply potential without inducing voltage loss of a threshold voltage drop, and thereby decoupling the corresponding stage from preceding stages in the plurality of stages;

a clock source including a plurality of clock generators, the clock source providing a plurality of clock signals coupled to the first and second pluralities of charge boosting circuits wherein the clock source includes a clock circuit including components tending to cause the frequency of the plurality of clock signals to change according to a first function, where the first function has an inverse relation with change in supply potential and is relatively unresponsive to changes in temperature.

12. The charge pump apparatus of claim 11, further comprising:

circuitry providing control signals to said at least one precharge circuit, so that in a first mode the at least one precharge circuit is in the first state, and in a second mode the at least one precharge circuit is in the second state, wherein the at least one precharge circuit includes:

a first PMOS transistor having a source terminal coupled to a source of the supply potential, a drain terminal coupled to the supply node, and a gate;

a second PMOS transistor having a source terminal coupled to the source node, a drain terminal coupled to the gate of the first PMOS transistor, and a gate coupled to a control node; and an NMOS transistor having a source terminal coupled to a reference supply, a drain terminal coupled to the gate of the first PMOS transistor, and a gate coupled to the control node.

13. The charge pump apparatus of claim 11, wherein the at least one precharge circuit comprises all of the precharge circuits in the plurality of precharge circuits, and the control signals include a first set of signals coupled to a first set of precharge circuits and a second set of signals coupled to a second set of precharge circuits, the first set of precharge circuits including a precharge circuit coupled to the supply node of the intermediate stage adjacent to the first stage in the series, and a second signal coupled to the supply node of the intermediate stage preceding the last stage in the series, so that the control signals are operable to enable all the stages in the series during a first mode, and operable to enable a subset of the stages in a second mode.

14. The charge pump apparatus of claim 11, wherein the clock source comprises:

a first clock generator generating a first clock signal of the plurality of clock signals in the first mode; and a second clock generator generating a second clock signal of the plurality of clock signals in the second mode.

15. A charge pump apparatus, comprising:

a plurality of stages including a first stage and a last stage, with one or more intermediate stages arranged in series between the first and last stages;

each stage in the plurality of stages including a supply node, an output node, and a pass gate, the pass gate having a first state coupling the supply node to the output node, and a second state blocking charge flow from the output node back to the supply node;

the first stage having its supply node coupled to a supply voltage;

the intermediate stages having respective supply nodes coupled to the output nodes of the respective preceding stages in the plurality of stages; and the last stage having its supply node coupled to the output node of its preceding stage in the plurality of stages, and its output node coupled to a load;

a first plurality of charge boosting circuits coupled to the supply nodes of the intermediate stages and of the last stage;

a second plurality of charge boosting circuits coupled to the pass gates of the first stage, the intermediate stages, and the last stage;

a plurality of precharge circuits coupled to the supply nodes of the intermediate stages and the last stage, at least one precharge circuit in the plurality of precharge circuits having a first state allowing the supply node to fluctuate at a level above a supply potential, and a second state coupling the supply node to the supply potential without inducing voltage loss of a threshold voltage drop, and thereby decoupling the corresponding stage from preceding stages in the plurality of stages;

a clock source providing a plurality of clock signals coupled to the first and second pluralities of charge boosting circuits, and the plurality of clock signals have a frequency which changes according to a first function in a first mode, and have a frequency which changes according to a second function in a second mode, wherein at least one of the first function and the second function is dependent on at least changes in the supply voltage, and at least one of the first function and the second function is dependent on at least changes in temperature; and circuitry providing control signals to said at least one precharge circuit and to the clock source, so that in the first mode the at least one precharge circuit is in the first state, and in the second mode the at least one precharge circuit is in the second state.

16. The charge pump apparatus of claim 15, wherein the at least one precharge circuit includes:

a first PMOS transistor having a source terminal coupled to a source of the supply potential, a drain terminal coupled to the supply node, and a gate;

a second PMOS transistor having a source terminal coupled to the source node, a drain terminal coupled to the gate of the first PMOS transistor, and a gate coupled to a control node; and an NMOS transistor having a source terminal coupled to a reference supply, a drain terminal coupled to the gate of the first PMOS transistor, and a gate coupled to the control node.

17. The charge pump apparatus of claim 15, wherein the at least one precharge circuit comprises all of the precharge circuits in the plurality of precharge circuits, and the control signals include a first set of signals coupled to a first set of precharge circuits and a second set of signals coupled to a second set of precharge circuits, the first set of precharge circuits including a precharge circuit coupled to the supply node of the intermediate stage adjacent to the first stage in the series, and a second signal coupled to the supply node of the intermediate stage preceding the last stage in the series, so that the control signals are operable to enable all the stages in the series during the first mode, and operable to enable a subset of the stages in the second mode.

18. The charge pump apparatus of claim 15, wherein the clock source includes a clock circuit including components tending to cause the frequency of the plurality of clock signals to change according to the first function, where the first function has an inverse relation with change in supply potential and is relatively unresponsive to changes in temperature.

19. The charge pump apparatus of claim 15, wherein the clock source includes a clock circuit including components tending to cause the frequency of the plurality of clock signals to change according to the second function, where the second function is relatively unresponsive to changes in supply potential.

20. The charge pump apparatus of claim 15, wherein the clock source includes a clock circuit including components tending to cause the frequency of the plurality of clock signals to change according to the second function, where the second function is relatively unresponsive to changes in supply potential and has a direct relation to changes in temperature.

21. The charge pump apparatus of claim 15, wherein the clock source comprises:
 a first clock generator generating a first clock signal of the plurality of clock signals in the first mode; and
 a second clock generator generating a second clock signal of the plurality of clock signals in the second mode.

22. A charge pump apparatus, comprising:
 a multistage charge pump, responsive to a plurality of clock signals, comprising:
  a plurality of stages including a first stage and a last stage, with one or more intermediate stages arranged in series between the first and last stages;
  each stage in the plurality of stages including a supply node, an output node, and a pass gate, the pass gate having a first state coupling the supply node to the output node, and a second state blocking charge flow from the output node back to the supply node;
  the first stage having its supply node coupled to a supply voltage;
  the intermediate stages having respective supply nodes coupled to the output nodes of the respective preceding stages in the plurality of stages; and
  the last stage having its supply node coupled to the output node of its preceding stage in the plurality of stages, and its output node coupled to a load;
  a first plurality of charge boosting circuits coupled to the supply nodes of the intermediate stages and of the last stage and to clock signals in the plurality of clock signals; and
  a second plurality of charge boosting circuits coupled to the pass gates of the first stage, the intermediate stages, and the last stage and to clock signals in the plurality of clock signals;
 a clock source providing the plurality of clock signals coupled to the multistage charge pump, and the plurality of clock signals have a frequency which changes according to a first function in a first mode, and have a frequency which changes according to a second function in a second mode, wherein the second function is different than the first function, and wherein at least one of the first function and the second function is dependent on at least changes in the supply voltage, and at least one of the first function and the second function is dependent on at least changes in temperature wherein the clock source comprises:
  a first clock generator generating a first clock signal of the plurality of clock signals in the first mode; and
  a second clock generator generating a second clock signal of the plurality of clock signals in the second mode; and
 circuits to enable all the stages in the plurality of stages in the first mode, and to enable less than all the stages in the plurality of stages in the second mode.

23. The charge pump apparatus of claim 22, wherein the clock source includes a clock circuit including components tending to cause the frequency of plurality of clock signals to change according to the first function, where the first function has an inverse relation with change in supply potential and is relatively unresponsive to changes in temperature.

24. The charge pump apparatus of claim 22, wherein the clock source includes a clock circuit including components tending to cause the frequency of plurality of clock signals to change according to the second function, where the second function is relatively unresponsive to changes in supply potential.

25. The charge pump apparatus of claim 22, wherein the clock source includes a clock circuit including components tending to cause the frequency of plurality of clock signals to change according to the second function, where the second function is relatively unresponsive to changes in supply potential and has a direct relation to changes in temperature.

26. An integrated circuit device, comprising:
 a memory having a first mode for at least one of programming and erasing and a second mode for reading;
 charge pump circuitry coupled to a node in the memory, operable in the first mode and the second mode, the charge pump circuitry including a multistage charge pump, responsive to a plurality of clock signals; and
 a clock source providing the plurality of clock signals, the plurality of clock signals having a frequency which changes according to a first function in a first mode, and having a frequency which changes according to a second function in a second mode, wherein the second function is different than the first function, and wherein at least one of the first function and the second function is dependent on at least changes in the supply voltage, and at least one of the first function and the second function is dependent on at least changes in temperature,
  wherein the clock source comprises:
   a first clock generator generating a first clock signal of the plurality of clock signals in the first mode; and
   a second clock generator generating a second clock signal of the plurality of clock signals in the second mode;
 a plurality of precharge circuits coupled to supply nodes of the intermediate stages and the last stage, at least one precharge circuit in the plurality of precharge circuits having a first state allowing the supply node to fluctuate at a level above the supply potential, and a second state coupling the supply node to a supply potential, and thereby decoupling the corresponding stage from preceding stages in the plurality of stages; and
 circuitry providing control signals to said at least one precharge circuit and to the clock source, so that in the first mode the at least one precharge circuit is in the first state, and in the second mode the at least one precharge circuit is in the second state.

27. The integrated circuit device of claim 26, wherein the at least one precharge circuit comprises all of the precharge circuits in the plurality of precharge circuits, and the control signals include a first set of signals coupled to a first set of precharge circuits and a second set of signals coupled to a second set of precharge circuits, the first set of precharge circuits including a precharge circuit coupled to the supply node of the intermediate stage adjacent to the first stage in the series, and a second signal coupled to the supply node of the intermediate stage preceding the last stage in the series, so that the control signals are operable to enable all the stages in the series during the first mode, and operable to enable a subset of the stages in the second mode.

28. The integrated circuit device of claim 26, wherein the multistage charge pump comprises:
    a plurality of stages including a first stage and a last stage, with one or more intermediate stages arranged in series between the first and last stages;
    each stage in the plurality of stages including a supply node, an output node, and a pass gate, the pass gate having a first state coupling the supply node to the output node, and a second state blocking charge flow from the output node back to the supply node;
    the first stage having its supply node coupled to a supply voltage;
    the intermediate stages having respective supply nodes coupled to the output nodes of the respective preceding stages in the plurality of stages; and
    the last stage having its supply node coupled to the output node of its preceding stage in the plurality of stages, and its output node coupled to a load;
    a first plurality of charge boosting circuits coupled to the supply nodes of the intermediate stages and of the last stage and to clock signals in the plurality of clock signals; and
    a second plurality of charge boosting circuits coupled to the pass gates of the first stage, the intermediate stages, and the last stage and to clock signals in the plurality of clock signals.

29. The integrated circuit device of claim 28, including circuits to enable all the stages in the plurality of stages in the first mode, and to enable less than all the stages in the plurality of stages in the second mode.

30. The integrated circuit device of claim 26, wherein the clock source includes a clock circuit including components tending to cause the frequency of the plurality of clock signals to change according to the first function, where the first function has an inverse relation with change in supply potential and is relatively unresponsive to changes in temperature.

31. The integrated circuit device of claim 26, wherein the clock source includes a clock circuit including components tending to cause the frequency of the plurality of clock signals to change according to the second function, where the second function is relatively unresponsive to changes in supply potential.

32. The integrated circuit device of claim 26, wherein the clock source includes a clock circuit including components tending to cause the frequency of the plurality of clock signals to change according to the second function, where the second function is relatively unresponsive to changes in supply potential and has a direct relation to changes in temperature.

33. A method comprising:
    producing in a first mode of operation, from a first clock generator, a first set of clock signals having a first clock frequency which changes according to a first function;
    producing in a second mode of operation, from a second clock generator, a second set of clock signals having a second clock frequency which changes according to a second function, wherein at least one of the first function and the second function is dependent on at least changes in a power supply voltage, and at least one of the first function and the second function is dependent on at least changes in temperature; and
    applying the first set of clock signals to a multistage charge pump having N stages to produce a charge pump output voltage in the first mode of operation and applying the second set of clock signals to a multistage charge pump to produce a charge pump output voltage in the second mode of operation; and
    configuring the multistage charge pump so that N stages are enabled in the first mode, and so that less than N stages are enabled in the second mode.

* * * * *